United States Patent
Boe et al.

(10) Patent No.: US 6,236,975 B1
(45) Date of Patent: May 22, 2001

(54) SYSTEM AND METHOD FOR PROFILING CUSTOMERS FOR TARGETED MARKETING

(75) Inventors: Barbara J. Boe, Frisco; Julia M. Hamrick; Marjorie L. Aarant, both of Dallas, all of TX (US)

(73) Assignee: Ignite Sales, Inc., Dallas, TX (US)

( * ) Notice: Subject to any disclaimer, the term of this patent is extended or adjusted under 35 U.S.C. 154(b) by 0 days.

(21) Appl. No.: 09/162,825

(22) Filed: Sep. 29, 1998

(51) Int. Cl.[7] .................................................. G06F 17/60

(52) U.S. Cl. .................... 705/7; 705/10; 705/14; 705/26; 705/27

(58) Field of Search .................... 705/10, 14, 28, 705/26, 27, 35, 36, 7; 235/493, 380, 449, 475; 902/27; 386/117, 46; 709/206, 217

(56) References Cited

U.S. PATENT DOCUMENTS

| | | | | |
|---|---|---|---|---|
| 5,041,972 | * | 8/1991 | Frost | 364/401 |
| 5,956,691 | * | 9/1999 | Powers | 705/4 |
| 5,974,398 | * | 10/1999 | Hanson et al. | 705/14 |

FOREIGN PATENT DOCUMENTS

0139313 * 8/1983 (EP).

OTHER PUBLICATIONS

Multimedia & Videodisc Monitor, Edge of Chaos, PP 1–4, Apr. 1995.*
Scott e. Sampson, Decision Sciences, Ramifications of Monitoring Service Quality Through passively Solicited Customer Feedback, PP 601–605, Sep. 1996.*
Leslie Marable, Marketing and Commerce, PP 1–2, Mar. 1997.*
Groupware users, Business Computing Brief, PP 1–2, Apr. 1995.*
"A New Weapon For Competitive Advantage," SQ software quarterly, reprinted from SQ magazine, vol. 2, No. 4, 1995.
"Why Firefly Has Mad Ave. Buzzing," Paul C. Judge, Business Week, 2 pgs, Oct. 7, 1996.
"Tuning in to Marimba," Jesse Freund, Wired, 2 pgs, Nov. 1996.
"In Webmoriam," Fred Hapgood, Wired, 3 pgs, Nov. 1996.
"The Promise of One," Wired, 8 pgs, May 1998.
"Web Can Help Answer Finance Queries," Matt Krantz, Investor's Business Daily, Jan. 17, 1998.
"IBM Intelligent Agents," Don Gilbert, Peter Janca, 7 pgs, Jan. 17, 1997.
"The Role of Intelligent Agents in the Informa . . . ," IBM Corporation, 12 pgs, 1995.
"Collaborative Filters," Jerry Michalski, Release 1.0, Nov. 1996.
I Want, David Kline, Wired 3.01, 3 pgs, Undated.
"Agent of Change," Scott Berkun, Wired 3.04, 3 pgs, Undated.

(List continued on next page.)

Primary Examiner—James P. Trammell
Assistant Examiner—Mussie Tesfamariam
(74) Attorney, Agent, or Firm—Baker Botts L.L.P.

(57) ABSTRACT

A targeted marketing system and method are provided that provide a customer with customer questions, receive responses to the customer questions from the customer, and store data associated with the responses. The customer is provided with a feedback page that graphically illustrates data associated with the customer's standing in a selected peer group. The customer is provided with options operable to adjust the customer's actual demographic to a hypothetical demographic, and data associated with hypothetical demographic changes from the customer is received and processed. Hypothetical feedback information is then displayed that graphically illustrates the hypothetical standing of the customer within the selected peer group such that the customer can see the effect of the hypothetical demographic changes.

28 Claims, 15 Drawing Sheets

OTHER PUBLICATIONS

"Story, Creating Lifelong Customer Relationships: Why the Race for Customer Acquisition on the Internet is So Strategically Important," Genni C. Combes, Jeetil J. Patel, iWord, vol. 2, Issue 4, 15 pgs, Sep. 1997.

"Intelligent Agents: A Technology and Business Application Analysis," Mark Nissen, Intelligent Agents, 35 pages, Nov. 30, 1995.

"You light up my life," Carolyn Ross, The Red Herring, Dec. 1996.

"Intelligent agents arrive for data management," Lynda Radosevich, Infoworld, Dec. 23/30, 1996.

Unknown Author, "MBI Interactive: MBI's Commitment to Measuring the Web, Website User Profile, Introducing MBinteractive, Millward Brown Interactive, Internet Advertising Bureau Online Advertising Effectiveness Study, IAB Advertising Effectiveness Study Executive Summary," 12 pgs, www.mbinteractive.com, May, 15, 1998.

Unknown Author, "Trajecta—Applications,Industry, Financial Services, Financial Services Scenario, Prospecting, Insurance," 6 pgs, www.trajecta.com, May 14, 1998.

Unknown Author, "Integrion: The Integrion Financial Network Solution," 3 pgs, "Description of Integrion Products and Services," 5 pgs, "Scope of the GOLD Message Summary," www.integrion.net, Mar. 20, 1998.

Unknown Author, "Capital One Online Customer Survey," 3 pgs, www.capitalone.com, © 1998, Undated.

Unknown Author, "You may select one answer per question," 7 pgs, www.majon.com, Undated.

Unknown Author, "Activity Summary Report," 1 page, "Demographics Report," 1 pg, "Automated Service for Internet Surveys Ushers in New Era of Fast, Easy and Affordable Market Research; Eliminates Need for Survey Software, Programming and Administration." 2 pgs, www.pathfinder.com, Mar. 24, 1998.

Unknown Author, "Acorn™ Lifestyles, Databases," 11 pgs, www.caci.com, Sep. 30, 1998.

"Database marketing predicts customer loyalty," Sarah E. Varney, Datamation, 4 pgs, www.datamation.com, Sep. 1996.

Unknown Author, Growth in World Wide Web May Be Slowing; Survey Finds Concerns About Privacy, 3 pgs, "GVU's 6th WWW User Survey," 16 pgs, www.cc.gatch.edu, Jan. 14, 1997.

"The Real Value of ON–LINE Communities," Arthur Armstrong and John Hagel III, Harvard Business Review, 5 pgs, May–Jun. 1996.

"Getting to Know," Miryam Williamson, Webmaster, 5 pgs, Sep. 1996.

"Brother, Can You Sparadigm?" Jim Sterne, Webmaster, 2 pgs, Sep. 1996.

"Banking's Best of the Newest," Chris Costanzo, Bank Technology News, 6 pgs, Dec. 1996.

"The Coming Battle for Customer Information," John Hagel III and Jeffrey F. Rayport, Harvard Business Review, 8 pgs, Jan.–Feb. 1997.

"Finders Keepers," Andreas Evagora, 6 pgs, www.teledotcom.com, Aug. 7, 1997.

"Introduction to Future trends: Intelligent Agents," Ron Rassner, 3 pgs, www.cnilive.com, Dec. 9, 1996.

"My Problem with Agents," Jaron Lanier, Wired, 2 pgs, Nov. 1996.

Unknown Author, "Neural networks, Who we are and what we do,Genetic Algorithms, Systems, Fuzzy Logic, Artificial life, Agenda, Book reviews," 11 pgs, 195.240.38.150/hccai/eng__al.htm, Aug. 7, 1997.

"Special Report: Making Money on the Net," Larry Armstrong, Amy Cortese and Kathy Rebello, Business Week, 7 pgs, Sep. 23, 1996.

"Building Consumer Trust with Accurate Product Recommendations: A White Paper on LikeMinds WebSell 2.1," Dan R. Greening, 16 pgs, Unknown Author, "Likeminds Technology", 4 pgs, www.likeminds.com/, Sep. 9, 1998.

Unknown Author, "Direct Hit: Direct Hit Launches, About Direct Hit, Press, Company, Executive Bios," 7 pgs, www-.directhit.com, Sep. 9, 1998.

Unknown Author, "CarPoint Payment Calculator," 1 pg, www.carpoint.msn.com/Loancalc, Undated.

Unknown Author, "Harvey—Learn about Harvey with the Harvey Tutorial," 35 pgs, www.homecom.com/harvey__presentation/index.html, Dec. 14, 1998.

Unknown Author, "Epiphany—Enterprise Relationship Management Systems, Company, About Us, Board of Advisors, Products, Clarity, Relevance, Momentum, Epicenter, Services, Information, Frequently Asked Questions," 18 pgs, www.epiphany.com; Unknown author, "About Meridian Marketing Group," 1 pg, www.ppgsoft.com/ppgsoft/marketsvcs.com, Undated.

Unknown Author, "Bits & Pixels," 14 pgs, www.bitpix.com, Jun. 24, 1998.

Adam Maria Gadomski, "Agents and Intelligence: The Concepts of Agent and Intelligent Agent," 6 pgs, wwwerg-.casaccia.enea.it/int/gadomaski/gad–agen.html, Jun. 24, 1998.

Unknown Author, "UMBC AgentNews Webletter, vol. 1, No. 10," 7 pgs, www.csee.umbc.edu/agentnews/96/10, Oct. 22, 1996.

Bruce Krulwich, "BargainFinder agent now publicly available," 1 pg, www.cs.umbc.edu/agentlist/achive/1995/0151.html. Unknown Author, "BargainFinder Agent," 5 pgs, bf.star.ac.com/bf/agent2.html, Jun. 24, 1998.

Unknown Author, "Intelliquest Information Group, Inc.: Corporate Profile," 6 pgs, www.intelliquest.com, May 15, 1998.

Robert D. Hof, Heather Green, and Linda Himelstein, "Special Report—Now It's Your Web," 7 pgs, www.businessweek.com/1998/40/b3598023.htm, Oct. 5, 1998.

Unknown Author, "Personalogic: Press Room, Product Showcases," 32 pgs, www.personalogic.com, Oct. 14, 1998.

Unknown Author, "Eliza, the Original Bot; Shallow Red ™: A Bot for year 200," 3 pgs, www.botspot.com/main.html, Jun. 24, 1998.

Unknown Author, "Net Perceptions : Company Overview, GroupLens Toolkit, Technology, How it works, Specifications, White Papers, Press Releases, Frequently Asked Questions," 39 pgs, www.netperceptions.com, Mar. 3, 1998.

Rick E. Bruner, "Advertising Age: Net Perceptions takes on Firefly with profiling system," 2 pgs, adage.com/interactive/articles/19970721/article4.html, Jul. 1997.

Unknown Author, "Services S1 Client Services: Info, Products, Customers, Partners," 25 pgs, www.S1.com, Mar. 17, 1998.

Unknown Author, HNC Software Inc.: Products, About HNC, News, Modeling Systems Products, 11 pgs, www.hnc-.com, May 14, 1998.

Unknown Author, "Softbots, Inc.," 6 pgs, www.softbots.com, Jan. 15, 1997.

Unknown Author, "Autonomy Agentware Personalized Intelligent Agents: Autonomy Corporation, Product Information, What is an Intelligent Agent, Press Releases," 9 pgs, www.agentware.com, Jan. 15, 1997.

Unknown Author, "Intelliweb Demo: AutoPlace," 6 pgs, www.micromass.com/demoworld/cardemo/index.html, Aug. 5, 1998.

Unknown Author, "Net Perceptions, Inc.: Contact Information, Info & FAQ, Applications, White Paper, Technical Specs, Quotes, Articles in Press, Press Releases, PR Firm, Officers & Background, Directory, Recruiting," 30 pgs, www.netperceptions.com, Undated.

Unknown Author, "One to One WebApps: The Angle, The Basic Principles of One to One Marketing," 19 pgs, www.broadvision.com, Jun. 15, 1997.

Unknown Author, "Intuit,Inc.: Corporate Background," 22 pgs, www.intuit.com, Mar. 25, 1998.

Unknown Author, "iWebPRO: Secure Electronic Commerce," 3 pgs, www.cosmo21.com/iwebpro/secure.htm, Aug. 7, 1997.

Unknown Author, "Gustos Guide: Why Gustos?, Our Technology, Privacy, FAQs, Test Drive, Installation, Help, Java Compatibility," 22 pgs, www.gustos.com, Undated.

"Building Relationships Intelligently: the Firefly Software Tools. No. 1 in a Series," Flyfly Networks, Inc. 14 pgs, Undated.

"You Light Up My Life," Carolyn Ross, The Red Herring, 5 pgs, Dec. 1996.

Unknown Author, Firefly: What is Firefly?, Firefly Community Policy, Join Firefly, Firefly Terms of Service 8 pgs, www.firefly.net "Agent of Change," Scott Berkun, Wired 3.04, 3 pgs "Firefly—Goldman Sachs Internet Conference," Summary Sheet, 2 pgs, Undated Unknown Author, "Engage.Knowledge™: Real–Time Visitor Intelligence," 3 pgs, www.engagetech.com/knowledge.htm, Jun. 5, 1998.

Unknown Author, "SelectCast™ for Ad Servers Facts, Aptex Software Inc.," 6 pgs, www.aptex.com, Undated.

Unknown Author, "Customer Profiling and GIS; Who are We?," 2 pgs, www.icontact.bc.ca/data.html, Aug. 7, 1997.

Unknown Author, "Vertigo Development Group, Services, Custom Development, ONE on ONE Banking, Products, People, Technology," 29 pgs, www.vertigodev.com, Feb. 5, 1997.

Unknown Author, "Claritas: The Precision Marketing Source: Precision Targeting, Precision Data, Industry–Based Solutions," 10 pgs, spider.claritas.com, Apr. 15, 1998.

"'Guerilla Marketing' is a great buzzword but its a losing strategy (footnotes from the Palwuk Papers)," Hal Pawuk, 3 pgs, www.pawluk.com/papers/gorilla.htm, Oct. 8 1996.

Unknown Author, "Kormoran Marketing & Communications: Customer Profiling, GIS Mapping, Internet & WWW Services, Database Services," 16 pgs, www.kormoran.com, Aug. 7, 1997.

Unknown Author, "Artificial Intelligence Research Groups and Resources," 9 pgs, www–mice.cs.ucla.ac.uk/misc/ai/ai.html, Aug. 7, 1997.

Unknown Author, "NetAngels: Trust Principles, What is an Angel, Users, Advertisers, Site Administrators, More About Nel Angels, FAQ, Employment," 20 pgs, www.netangels.com, Oct. 1, 1996.

Unknown Author, "Aptex Software," 2 pgs, www.hnc.com
Unknown Author, "Aptex Software:Delivering on the ROI Promise, SelectCast Advantage to Publishers, Advertising ROI in Action, SelectCast's Premiere Customers, Conclusion: What's Next on the Horizon at Aptex," 15 pgs Aptex Software—HNC Company, Nov. 6, 1997.

Unknown Author, "General Magic: Company Information, Agent Technology," 2 pgs, www.generalmagic.com, May, 15, 1998.

Unknown Author, "Trends and Predictions, Agents in Action, How are they Different?," 4 pgs, www.yourcommand.com, Undated.

Unknown Author, "Anderson Consulting: Center for Strategic Technology Research, Who We Are, Thought Leadership," 5 pgs, www.ac.com, Jun. 24, 1998.

Unknown Author, "Epilson: Turning data into Information and information into Marketing Solutions, Strategic Direct Marketing," 4 pgs, www.strategic–direct.com, Apr. 15, 1998.

Bruce Krulwich, Chad E. Burkey, Theodore D. Anagnost, and Mark Jacobson, "Agents—CSTar, CSTaR Intelligent Agents—Infofinders, Music World, LifeStyle Finder," Anderson Consulting, Home Page, Jun. 24, 1998.

* cited by examiner

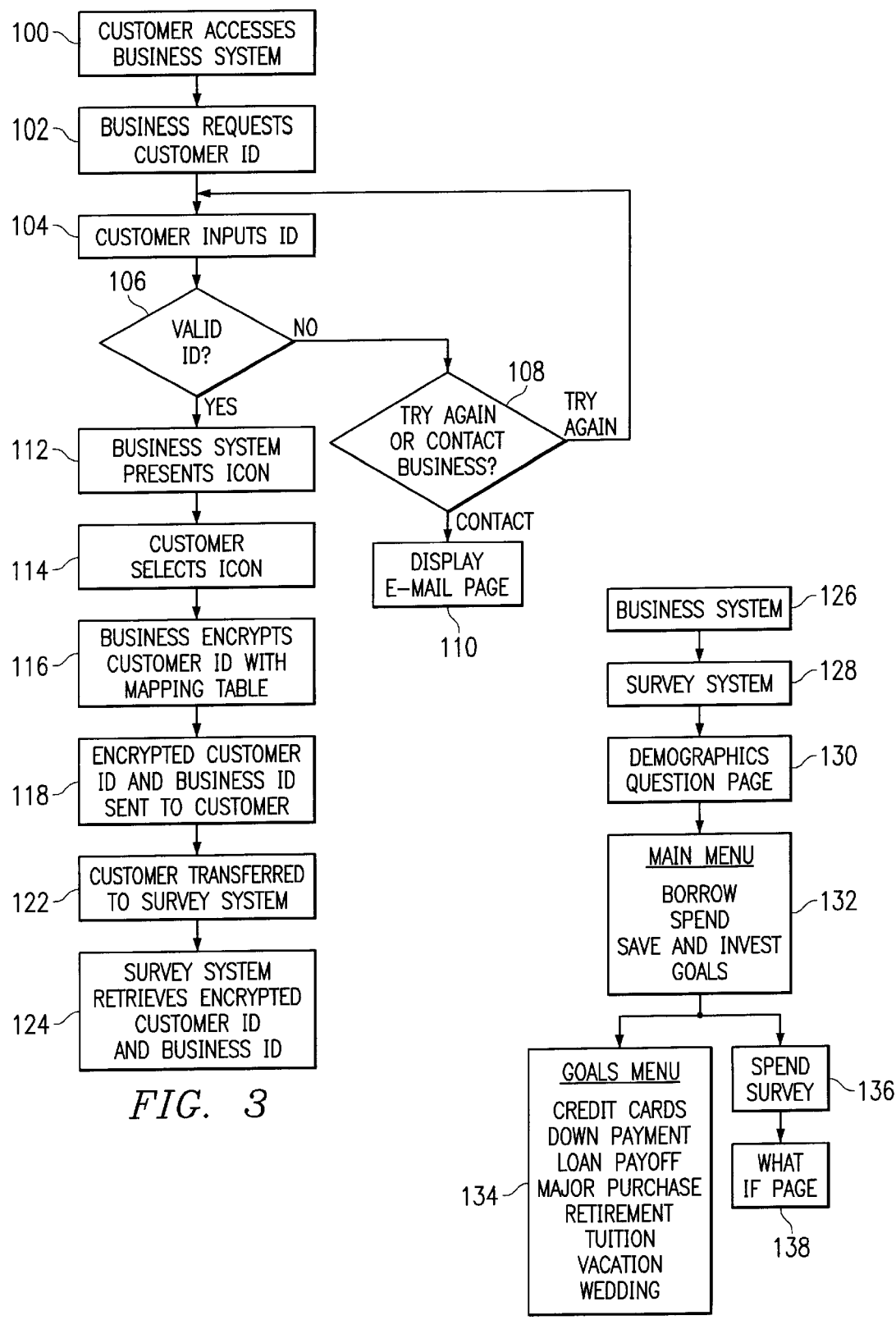

InterestMatch

556 — RESULTS BASED ON ALL DATA     554

558 — DEBIT CARD

| CUSTOMER IDENTIFICATION NUMBER | PROBABILITY OF PURCHASE | LINK TO PROBABILITY PROFILE |
|---|---|---|
| 635891 | 88% | PROBABILITY PROFILE 1 |
| 215389 | 59% | PROBABILITY PROFILE 2 |
| 946774 | 23% | PROBABILITY PROFILE 3 |
| AND SO ON.... | | |

560   562   564

[NOTE: INDIVIDUALS WHO ANSWERED THEY ALREADY HAVE THIS TYPE OF PRODUCT/SERVICE ARE NOT INCLUDED IN THE REPORT]

---

PROBABILITY PROFILES:         566

| PROFILE NUMBER | PROBABILITY | PROFILE DESCRIPTION |
|---|---|---|
| 1 | 88% | NUMBER OF CHILDREN <= 1<br>INCOME <= $59,999<br>ENJOY TRACKING INVESTMENTS = VERY MUCH<br>DREAM CAR = SPORTS CAR OR SPORT UTILITY VEHICLE |
| 2 | 59% | GENDER = FEMALE<br>EDUCATION = POST GRADUATE DEGREE<br>VEHICLES = AMERICAN AND FOREIGN<br>VEHICLES = LEASED<br>CREDIT CARD BALANCE = PAY OFF EACH MONTH |
| 3 | 23% | NEIGHBORHOOD = SUBURB OR RURAL<br>CHILDREN => 3<br>INCOME SOURCE = PENSION<br>VEHICLES = AMERICAN<br>HOBBY SPENDING = $250 TO $500 PER MONTH |

|  | THIS MONTH | | | THIS YEAR | | |
| --- | --- | --- | --- | --- | --- | --- |
| PRODUCT | INFO | APPLY | SUBMIT | INFO | APPLY | SUBMIT |
| CREDIT CARDS | 4 | 1 | 0 | 10 | 5 | 2 |
| LOANS | 0 | 0 | 0 | 2 | 2 | 1 |
| TYPE OF VEHICLES | 2 | 3 | 0 | 7 | 7 | 1 |
| LEASED VEHICLES | 0 | 0 | 0 | 0 | 0 | 0 |
| PURCHASED VEHICLES | 0 | 0 | 0 | 0 | 0 | 0 |
| VEHICLES | 1 | 0 | 0 | 1 | 0 | 0 |
| NO VEHICLES | 0 | 0 | 0 | 0 | 0 | 0 |
| SPENDING | 1 | 1 | 0 | 4 | 1 | 0 |
| RENT | 0 | 0 | 0 | 0 | 0 | 0 |
| MORTGAGE | 0 | 0 | 0 | 1 | 0 | 1 |
| USE OF INCOME | 0 | 0 | 0 | 1 | 31 | 29 |
| METHOD OF PAYMENT | 1 | 1 | 0 | 1 | 3 | 1 |
| CREDIT CARDS | 0 | 0 | 0 | 0 | 0 | 0 |
| DEBIT CARDS | 0 | 0 | 0 | 0 | 0 | 0 |
| CLUBS | 0 | 0 | 0 | 0 | 0 | 0 |
| HOBBY | 0 | 0 | 0 | 0 | 0 | 0 |
| CLOTHES SHOPPING | 0 | 0 | 0 | 0 | 0 | 0 |
| RETIREMENT PLANS | 1 | 0 | 0 | 1 | 0 | 0 |
| SAVINGS | 4 | 4 | 0 | 4 | 4 | 0 |
| APPROACH INVESTMENTS | 0 | 0 | 0 | 0 | 0 | 0 |
| LEVEL OF RISK | 0 | 0 | 0 | 0 | 0 | 0 |
| TRACK INVESTMENTS | 0 | 0 | 0 | 0 | 0 | 0 |
| SAVINGS | 0 | 0 | 0 | 0 | 0 | 0 |
| GOALS | 2 | 1 | 0 | 3 | 2 | 1 |

FIG. 6c

SYSTEM AND METHOD FOR PROFILING CUSTOMERS FOR TARGETED MARKETING

TECHNICAL FIELD OF THE INVENTION

This invention relates generally to the field of data processing and more particularly to a system and method for profiling customers for targeted marketing.

BACKGROUND OF THE INVENTION

Businesses have a need to market their products and services to potential customers. Currently, some of them rely on non-targeted advertising systems such as mass mailings to a general geographic area. However, this approach lacks the ability to target specific potential customers for specific products or services.

Alternatively, some businesses purchase previously compiled statistical data. However, the data obtained by this method is limited in that the research is typically based on small samples of the population and is typically historical data. Thus, the data is generalized and does not give the businesses any information regarding the desires or needs of specific potential customers.

Still other businesses conduct surveys through telemarketing or other types of research companies. Although telemarketing may be used to sell products and services to willing customers, this approach requires businesses to contact all potential customers without any knowledge as to the likelihood that any particular one will purchase a specific product or service.

Therefore, a need has arisen for a new system and method for profiling customers for targeted marketing that overcomes the disadvantages and deficiencies of prior art systems and methods.

SUMMARY OF THE INVENTION

In accordance with the present invention, a system and method for profiling customers for targeted marketing is provided which substantially eliminates or reduces disadvantages and problems associated with prior systems and methods for marketing.

In accordance with one embodiment of the present invention, a method of compiling customer data using an on-line interaction between a customer and a survey system is provided that supplies the customer with questions, receives responses, and stores data associated with the responses. A relative situation display is then provided to the customer that graphically illustrates data associated with the customer's standing in a selected peer group. Later, the customer is provided with the opportunity to adjust his or her actual situation to a hypothetical situation. After receiving and processing the data associated with these adjustments, hypothetical situation information is displayed that graphically illustrates the standing of the customer within the selected hypothetical peer group such that the customer can see the effect of the adjustments.

An important technical advantage of the present invention is that a business may obtain information from customers that allows the business to target its marketing efforts for specific products and services to specific customers who are more likely than the general population to purchase those products and services. One important aspect of the present invention is that the customer is encouraged to provide data to the customer survey system because the customer is provided with interesting and useful information in exchange for that data, such as relative and hypothetical situation information and information relating to setting and achieving goals.

BRIEF DESCRIPTION OF THE DRAWINGS

For a more complete understanding of the present invention, the objects and advantages thereof, reference is now made to the following descriptions taken in connection with the accompanying drawings in which like reference numbers indicate like features and wherein:

FIG. 3 is a flowchart showing one embodiment of a process through which a potential or existing customer may access one embodiment of a survey system constructed according to the teachings of the present invention.

FIG. 4a is a diagram showing an embodiment of a survey system constructed according to the teachings of the present invention from the perspective of a potential or existing customer.

FIG. 6b is a screen shot showing an exemplary Interest-Match report constructed according to the teachings of the present invention.

FIG. 6c is a screen shot showing an exemplary Target-Match report constructed according to the teachings of the present invention.

DETAILED DESCRIPTION OF THE INVENTION

Figure 1:
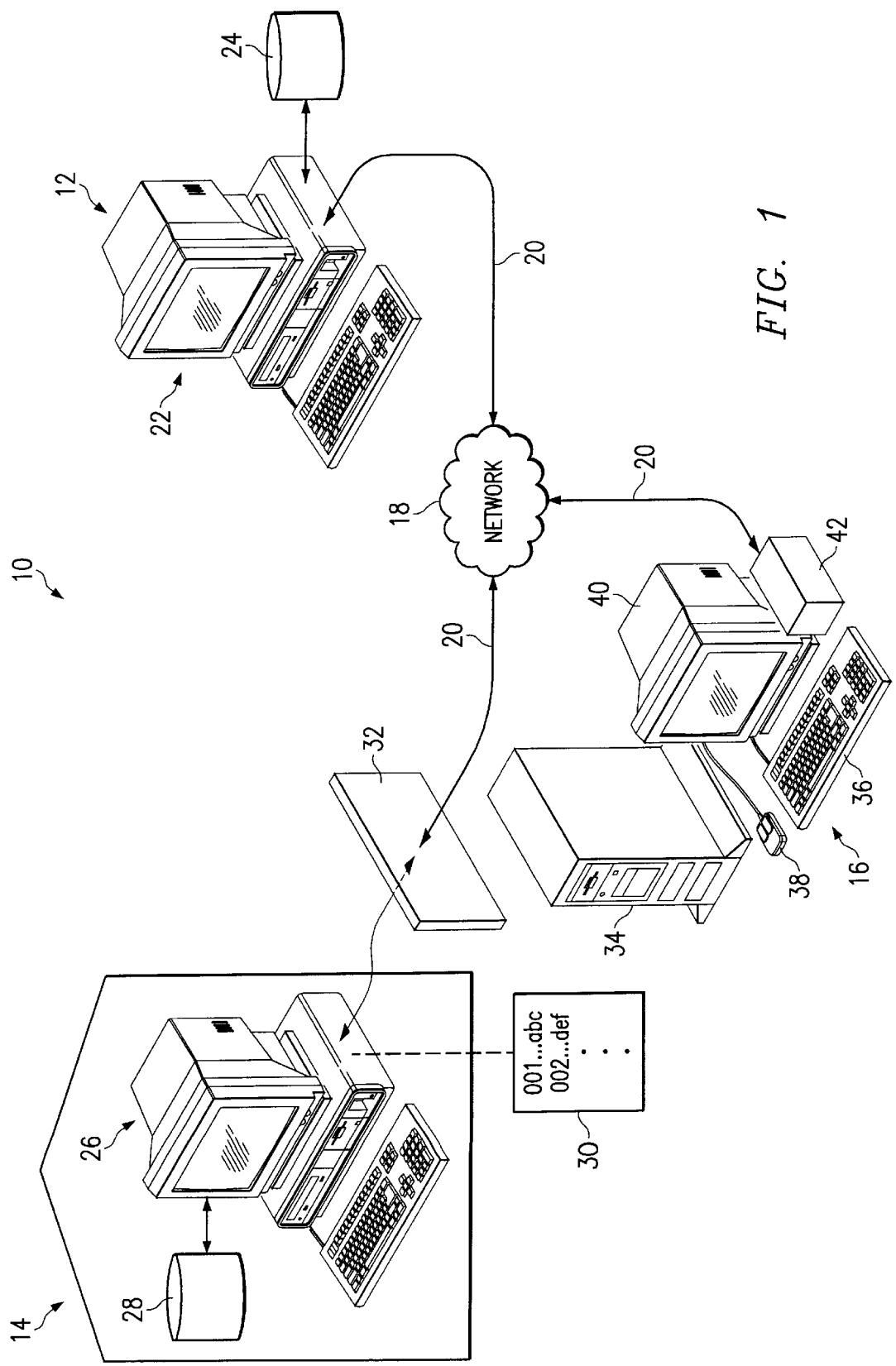
FIG. 1 is a block diagram of one embodiment of a targeted marketing system constructed according to the teachings of the present invention.

FIG. 1 is a block diagram of a targeted marketing system 10 which comprises a survey system 12, a business system 14 and a customer system 16. Survey system 12, business system 14 and customer system 16 are coupled to one another and communicate through a network 18. Network 18 may comprise a plurality of communication lines 20.

In general, the system of the present invention allows a business to survey specific customers and to identify ones of such customers that might want to purchase particular products or services. This is accomplished by encouraging the customer to complete a series of demographic questions. The customer wants to do this because at the end of the process the customer receives feedback showing where he stands relative to his peers. The customer is also allowed to explore various "what-if" scenarios to see how his relative position changes when various elements of his demographic are altered. Accordingly, the customer receives valuable evaluative information as a result of the process and the business receives information that allows for highly-defined targeted marketing efforts. All of this may be accomplished in the convenient, non-intrusive environment of an on-line interaction.

Business system 14 may be used by a business to communicate to survey system 12 the business' preferences regarding a survey for its existing or potential customers. These preferences may include survey questions and answers, as well as color schemes, logos, advertisements, and the like. Survey system 12 may then prepare a customized survey for that business' existing or potential customers.

When a customer accesses the survey, survey system 12 may request demographic information to characterize that customer. This information may include income level, number of children, education level, gender, age, or any other information. After the customer has been characterized using the information supplied by the customer, survey system 12 may present survey questions to the customer. Once the survey, or a specified portion of it, is completed by the customer, survey system 12 may then transmit graphical feedback reports to customer system 16 to show the customer how his or her responses compare to responses of other customers with the same or similar demographics.

Survey system 12 may also process the data associated with numerous demographics and survey responses in order to prepare customized reports for the business. Business system 14 may then retrieve from survey system 12 these customized reports, allowing the business to target its marketing efforts to specific potential customers who may be more likely to purchase specific products or services than other potential customers.

Communication lines 20 may be any type of communication link capable of supporting data transfer. In one embodiment, the communication lines 20 may comprise, alone or in combination, Integrated Services Digital Network (ISDN), Asymmetric Digital Subscriber Line (ADSL), T1 or T3 communication lines, hardwire lines, or telephone links. It will be understood that the communication lines 20 may comprise other suitable types of data communication links. Communication lines 20 may also connect to a plurality of intermediate servers between network 18 and survey system 12, business system 14 and customer system 16.

In one embodiment, the network 18 may comprise dial access via a telephone link. In this embodiment, survey system 12, business system 14 and customer system 16 may be remote from each other and located anywhere in the world. In one embodiment, systems 12, 14 and 16 may connect and communicate with each other via modems and analog or digital communication lines. Moreover, the network 18 may be any interconnection found on any computer network such as a local area network (LAN), a wide area network (WAN), the Internet, or any other communications and data exchange systems created by connecting two or more computers.

As shown in FIG. 1, survey system 12 comprises matching server 22 and matching database 24. Matching server 22 may comprise a dedicated computer, with one or more processors, one or more input devices, one or more output devices, and one or more communication devices.

Business system 14 comprises business server 26 and business database 28. Business server 26 comprises mapping table 30. Mapping table 30 may be a relational data structure that provides a correlation between an input and an output. Business system 14 may further comprise one or more firewalls 32. In one embodiment, firewall 32 may be located between network 18 and business server 26. Firewall 32 protects business system 14 from both intentional and unintentional damage which could pass through network 18. Firewall 32 may comprise hardware such as a computer with security measures, e.g., a dial-back feature, or may comprise defensive coding software. In general, firewall 32 receives data from network 18, determines whether the data could be harmful and, if not, transmits the data to business system 14. In an alternative embodiment, one or more firewalls 32 may be placed between business server 26 and business database 28, between network 18 and matching server 22, between matching server 22 and matching database 24, or in any other suitable location.

Customer system 16 may be a personal computer that comprises a processor 34; one or more input devices, such as a keyboard 36 or a mouse 38; one or more output devices, such as a printer or display 40; and a communication device, such as a modem 42.

As will be described in more detail below, business system 14 communicates with survey system 12 through network 18. Business system 14 provides to survey system 12 a variety of information to customize the survey to be completed by a business' existing or potential customers, such as questions and answers, color choices, logos, advertisements, banners, services and products, product information, application information, or the like.

After a business has provided the necessary information to survey system 12, an existing or potential customer using customer system 16 communicates with survey system 12 through network 18 and provides information that may be used by survey system 12 to create a demographic characterization of that customer. This information may include income level, number of children, education level, gender, age, or the like. The customer then provides to survey system 12 responses to the series of survey questions previously chosen by the business. Survey system 12 may then process the data associated with numerous customers' demographics and survey responses in order to present product and service information to the customer while he or she is on-line and to prepare customized reports for the business. Business system 14 may then retrieve from survey system 12 through network 18 these customized reports, allowing the business to target its marketing efforts to specific potential customers who may be more likely to purchase specific products or services than other potential customers. Business system 14 may also retrieve from survey system 12 any applications received from customers requesting specific products or services.

Figure 2:
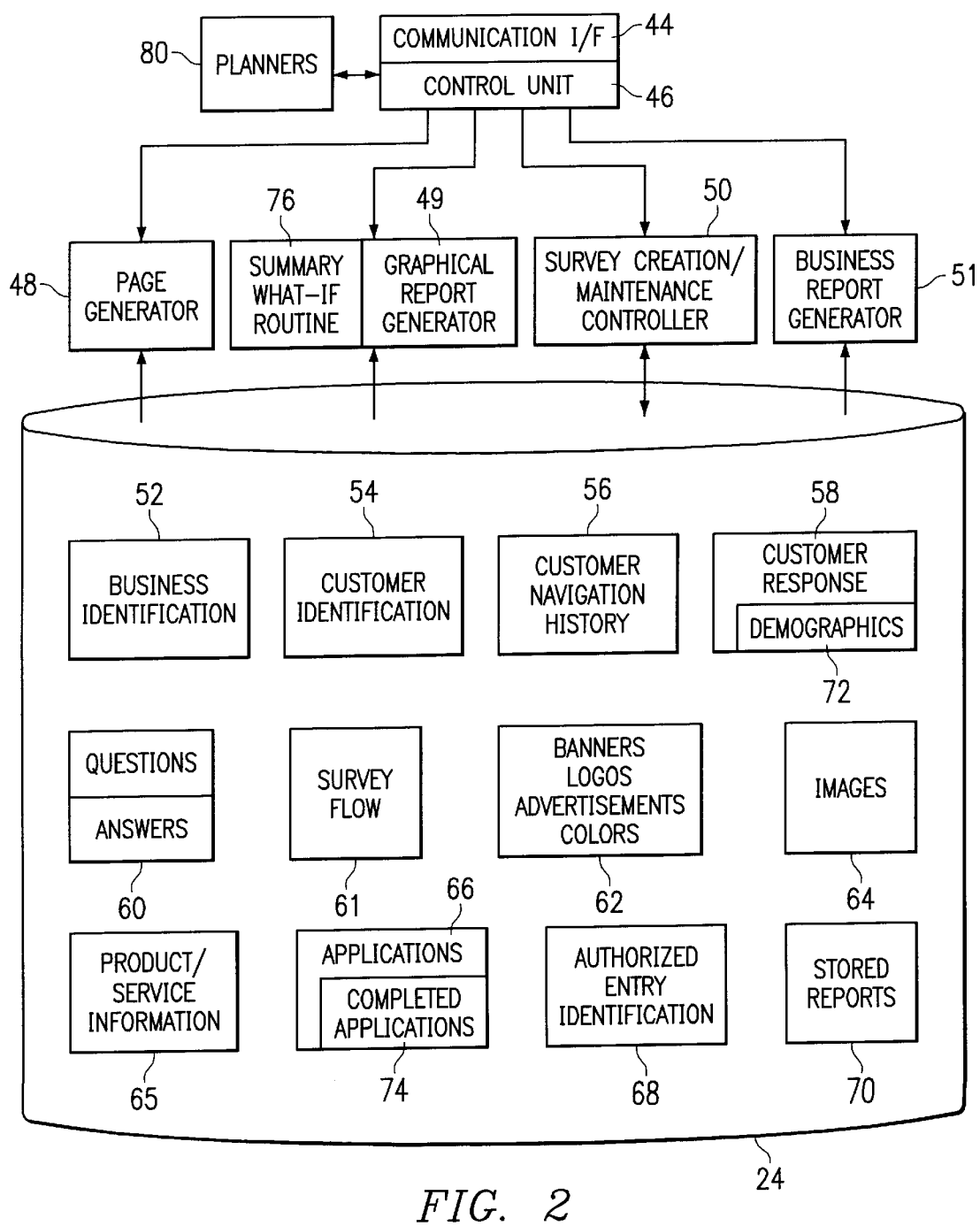
FIG. 2 is a block diagram that illustrates the routing and exchange of various types of data within one embodiment of a survey system constructed according to the teachings of the present invention.

FIG. 2 is a block diagram that illustrates the routing and exchange of various types of data within survey system 12. In general, survey system 12 prepares customized surveys based on data received from business system 14, characterizes customers based on demographic information, submits surveys to customers, stores responses to surveys, presents feedback to customers, presents product and service information to customers, receives applications from customers, and prepares reports for business system 14 to use for targeted marketing.

Survey system 12 may comprise a number of features designed to benefit customers in order to encourage them to complete the survey. For example, survey system 12 may provide to customer system 16 graphical reports that compare the customer's responses to the responses of other customers with the same demographics. Survey system 12 may also comprise a feature that allows a user of customer system 16 to retrieve information regarding a business' products or services and to apply for those products or services. The applications for the products or services may be stored by survey system 12 in matching database 24 for later retrieval by business system 14. Survey system 12 may also comprise a feature that allows a customer to partially complete the survey by storing data in matching database 24 regarding which survey question was last answered by the customer and on what date. When that customer later returns to complete more of the survey, survey system 12 may then present the subsequent question without requiring the customer to start again from the first question. In these situations in which the customer only partially completes the survey, survey system 12 may display a customized menu to show the user of customer system 16 what percentage of the survey he or she has completed and the date of the most recent visit. Survey system 12 may also comprise a feature that allows a customer to provide information regarding certain financial goals, such as retirement or education, and to graphically ascertain in real time what adjustments need to be made to meet those goals.

As shown in FIG. 2, survey system 12 comprises communication interface 44 and control unit 46. Communication interface 44 allows survey system 12 to communicate through network 18 with business system 14 and customer system 16. Control unit 46 comprises page generator 48, graphical report generator 49, survey creation/maintenance controller 50, and business report generator 51.

Page generator 48, graphical report generator 49, survey creation/maintenance controller 50, and business report generator 51 may all access matching database 24. Matching database 24 may comprise a plurality of tables containing useful data. These tables may include, among others, business identification table 52, customer identification table 54, customer navigation history table 56, customer response table 58, question and answer tables 60, survey flow table 61, banners/logos/advertisements/colors table 62, images table 64, product/service information table 65, application table 66, authorized entry identification table 68 and stored reports table 70. Customer response table 58 may comprise customer demographics 72 created by survey system 12 from information provided by customers, and application table 66 may comprise completed application table 74 with application information received from customers.

Page generator 48 may retrieve data from tables 52, 54, 56, 58, 60, 61, 62, 64, 65 and 66 in order to generate data sets which may be sent through communication interface 44 and network 18 to business system 14 or customer system 16. For example, page generator 48 may receive an identification number from customer system 16, as described in more detail below in connection with FIG. 3. Page generator 48 may match this identification number with data in business identification table 52 and customer identification table 54 in order to allow page generator 48 to retrieve the corresponding data from tables 56, 58, 60, 61, 62, 64, 65, and 66 that is associated with that particular business and that particular customer. Using the retrieved data, page generator 48 may generate the data sets and display them at customer system 16. Page generator 48 may also generate data sets in a similar manner for communication with business system 14. The data sets generated by page generator 48 may be used either to communicate information produced by survey system 12 to customers or businesses or to prompt customers or businesses to communicate information to survey system 12.

Thus, page generator 48 does not generate the same data sets for all customers, but instead generates data sets that are customized both for the business and for the customer. For example, when a user of customer system 16 accesses survey system 12, page generator 48 may determine which business is associated with that customer. After establishing this, page generator 48 may retrieve information regarding that business' preferences for presenting a survey for that customer, such as colors, banners, logos, advertisements, questions and answers, products, services and applications. Thus, page generator 48 presents different data sets depending on which business is involved. In addition, page generator 48 may also retrieve information regarding the customer, such as how the customer responded to demographic questions and which survey questions the customer has already answered. Page generator 48 may use this information in addition to the business-related information to generate data sets within the survey, such as by customizing the survey menu to show the percentage completed by that customer and the previous date of entry.

Page generator 48 may also determine which question to present next to the customer based on the business identification number and the customer's response to the previous question. The business identification number is used by page generator 48 to access the set of questions associated with that business in matching database 24. Thus, each business may choose a different set of questions that may be customized to include questions related to any or all products and services the business offers while omitting questions related to any products or services that it does not offer. The customer's response to the previous question may be used by page generator 48 to omit questions chosen by the business for inclusion in the survey but made irrelevant by the customer's previous response. For example, if a customer responds to a question that he or she rents housing, page generator 48 could skip subsequent questions relating to mortgage payments because they would not apply to that customer.

Page generator 48 may also present advertisements for products and services during the survey. These advertisements may be chosen based on the customer's demographics, as well as the subject matter of the associated survey questions. In addition, the advertisements may be chosen based on the combination of the customer's demographics and his or her responses to the previous survey questions. Thus, the choice of advertisements may be updated as the customer responds to survey questions and survey system 12 can better determine to which advertisements that particular customer will respond favorably.

In order to determine which advertisement to display initially, survey system 12 may compare the customer's demographics to the attributes of each previously established "demographic" profile. Survey system 12 may then select the "demographic" profile with matching attributes. Survey system 12 may then select the product or service with the highest probability of purchase for that "demographic" profile. Finally, survey system 12 may select from matching database 24 advertisements and/or links for those products or services to display for the customer. As the customer responds to the survey questions, survey system 12 may update the choice of advertisement by repeating the above process for profiles based on all data as opposed to profiles based on demographic data only. Thus, with each response from a customer, survey system 12 may update the "all data" profile for that particular customer and choose a new advertisement from matching database 24 with a more reliable probability of purchase each time.

Graphical report generator 49 may use data processed by survey system 12 to generate graphical reports for users of customer system 16. These graphical reports show the customer how his or her survey responses compare to the survey responses of other customers with the same demographics. Thus, as with the data sets generated by page generator 48, these graphical reports are customized for each customer because the data presented will vary based on the particular customer's demographics. Graphical report generator 49 also comprises summary/what-if routine 76 which generates graphical summaries of the comparison data previously prepared by the graphical report generator 49. Summary/what-if routine 76 also generates graphical summaries of comparison data based on hypothetical adjustments made by a customer to his or her demographics, such as number of children, income level, or the like. The reports produced by graphical report generator 49 may be generated in real time and may be stored in matching database 24 in stored reports table 70.

Survey creation/maintenance controller 50 may retrieve data from and store data in matching database 24. Thus, the data retrieved by page generator 48 and graphical report generator 49 from tables 52, 54, 56, 58, 60, 61, 62, 64, 65 and 66 may be created and edited by survey creation/maintenance controller 50. According to one embodiment of the present invention, survey creation/maintenance controller 50 may be manipulated by a user of survey system 12 in order to establish customized surveys for businesses. In an alternative embodiment, a business may manipulate survey creation/maintenance controller 50 using business system 14 to create or edit its own survey.

Business report generator 51 may use data processed by survey system 12 to generate reports for users of business system 14. As described in more detail below in connection with FIGS. 6*a–d,* business report generator 51 may generate a variety of reports based on the data obtained through the demographics, survey responses, and planner information collected from customer systems 16.

Survey system 12 may further comprise an anonymity feature to ensure that the identity of a user of customer system 16 would only be available to the business. For example, a customer may be required to access business system 14 before being given access to survey system 12. While the customer is accessing business system 14, business system 14 may request a customer identification number, such as an account number or any other specially designated personal identification number(s). Business system 14 may then validate and encrypt the customer identification number using mapping table 30, with the customer identification number as the input and the encrypted number as the output. This encrypted number may then be provided to survey system 12 to identify that particular customer.

Therefore, unless a customer provides information while applying for products or services, survey system 12 may never have access to the original customer identification number, making it impossible for survey system 12 to identify the actual customer by name, address, or any other means. This anonymity feature will encourage users of customer system 16 to provide the personal information to survey system 12 that is beneficial for targeted marketing. If the customer does apply for a product or service and provides identifying information to survey system 12, this information may be stored in completed application table 74 of matching database 24 with security features designed to prevent unauthorized access. In addition, this identifying information may be immediately deleted from matching database 24 after it is retrieved by business system 14. Finally, as another security feature, the data entered by the customer may be encrypted before being transmitted from customer system 16 to survey system 12. In accordance with this feature, the data may be encoded using a mathematical formula, for example, that makes the data unreadable without the survey system's 12 key to decode it.

Survey system 12 further comprises a set of graphical planners 80 with which users of customer system 16 may set and see how to attain financial goals for various situations, such as retirement, education, vacation, or the like. These planners 80 are beneficial because they provide the user of customer system 16 the opportunity to easily see what adjustments, if any, the customer needs to make in order to meet his or her financial goals. This feature may be used as a reward for customers and may motivate them to access survey system 12 and provide responses to a survey. In addition, survey system 12 may store the data entered by a user of customer system 16 when setting these financial goals. Survey system 12 may then provide the data to the business via business system 14 to allow the business to help the customer attain those financial goals by marketing related products and services to that customer.

FIG. 3 is a flowchart showing one embodiment of a process through which a user of customer system 16 may access survey system 12. In this embodiment, a user of customer system 16 first accesses business system 14 through network 18, as shown in step 100. The method then proceeds to step 102 where business system 14 prompts the customer to enter a customer identification number. This customer identification number may comprise one or more identifying numbers or words, such as an account number, a name, a birth date, or the like. After the customer enters the identification number in step 104, business system 14 verifies that the identification number is valid, as shown in step 106. If the identification number is invalid, business system 14 notifies the customer and allows the customer to choose whether to enter a new number or contact the business, as shown in step 108. If the customer chooses to contact the business, business system 14 displays an e-mail page that prompts the customer to enter the necessary information to notify the business that the identification number is not being accepted, as shown in step 110. Otherwise, the customer is prompted to enter a new identification number in step 104.

Once the customer has entered a valid identification number, the method proceeds to step 112 where business system 14 presents an icon to allow the customer to access survey system 12. If the customer selects the icon, as shown in step 114, business system 14 encrypts the customer's identification number using mapping table 30, as shown in step 116. The method then proceeds to step 118 where business system 14 passes the encrypted customer identification number and the business' own identification number(s) to customer system 16 through network 18. Business system 14 then transfers the customer to survey system 12 in step 122. Finally, survey system 12 retrieves from customer system 16 the encrypted customer identification number and the business identification number(s) in step 124.

In an alternative embodiment, business system 14 may present an icon to allow the customer to access survey system 12 before business system 14 prompts the customer to enter a customer identification number. If the customer then selects the icon, business system 14 may prompt the customer to enter a customer identification number. The method may then continue as before with step 104 in FIG. 3.

FIG. 4a is a process flow diagram showing an embodiment of the present invention from the perspective of a user of customer system 16. Block 126 shows the customer beginning by accessing business system 14. Through a process such as the one described in connection with FIG. 3, the customer then accesses survey system 12 in block 128, where survey system 12 displays a welcome message. If the customer has not accessed survey system 12 before, survey system 12 presents a demographics question page to the customer, as shown in block 130. This demographics question page prompts the customer to enter demographic information about himself or herself. This demographic information includes personal characteristics of the customer, such as income level, number of children, education level, age, gender, and the like. Survey system 12 may also present the demographics question page to customers who have accessed the survey system in the past if a certain period of time has passed, such as six months or one year, so that their demographic information can be updated. In addition, survey system 12 may prompt the customer upon each visit to update demographic information if any characteristics have changed since the previous visit.

In block 132, survey system 12 presents to the customer a main menu that allows the customer to choose which part of the survey to answer and also allows the customer to access the planners 80 to set financial goals. FIG. 4a shows two types of choices a customer could make from the main menu. If the customer wants to access the planners 80, he or she may choose the "goals" option. Survey system 12 may then present a goals menu, as shown in block 134. However, if the customer wants to access the survey, he or she may choose any one of the survey options from the main menu, such as the "spend" option. The customer may then be given the corresponding survey questions that were previously chosen by the business and stored in matching database 24, as shown in block 136. Within the survey section, the customer may receive feedback pages after answering each question or each few questions. Then survey system 12 may present a "what-if" page, as shown in block 138, after the customer has completed the survey section.

Figure 4B:
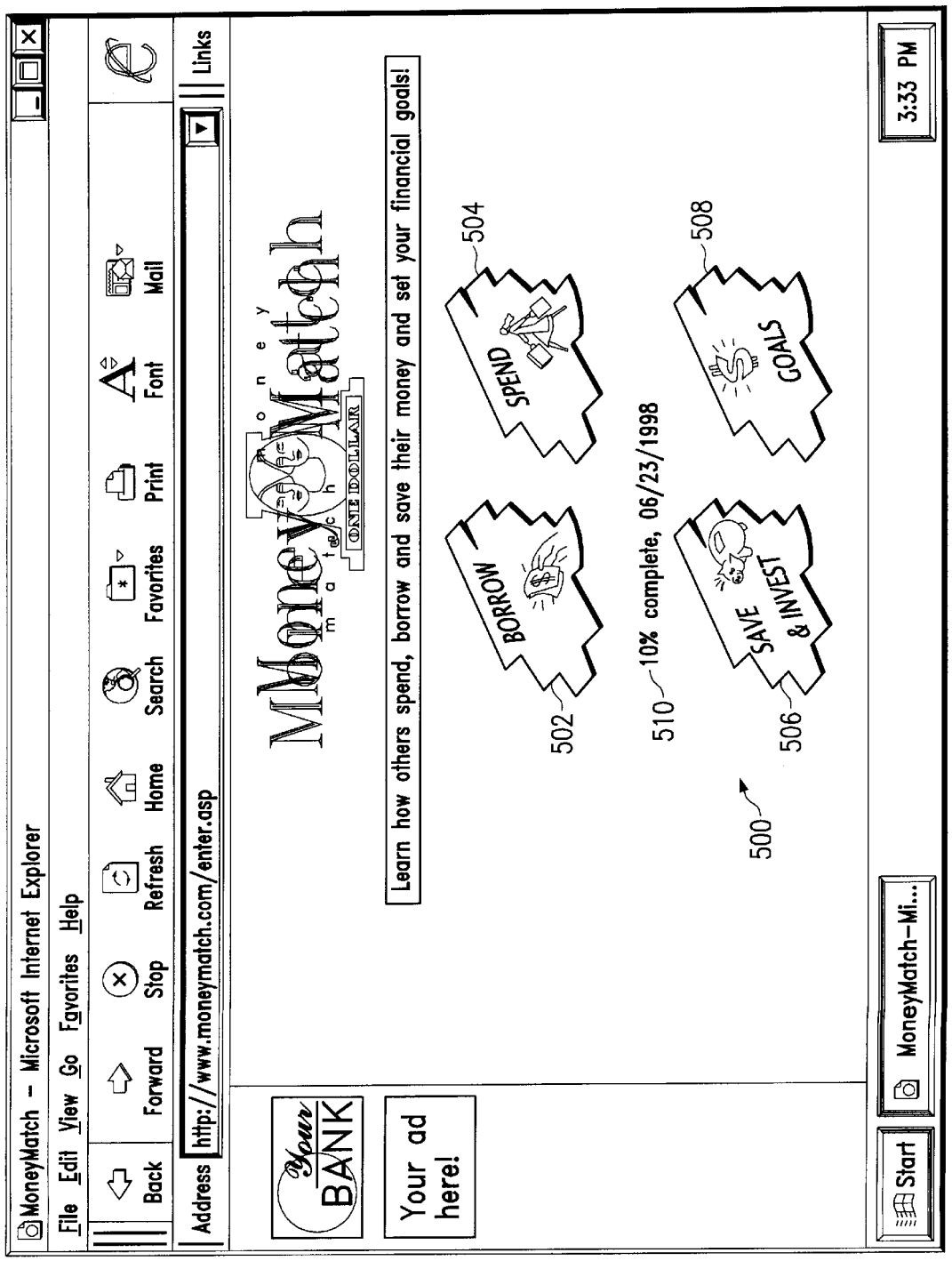
FIG. 4b is a screen shot depicting one embodiment of a main menu of a survey system constructed according to the teachings of the present invention.

FIG. 4b is a screen shot depicting one embodiment of the main menu 500 presented by survey system 12 in block 132. This embodiment includes three survey options: borrow 502, spend 504, and save & invest 506. It will be understood that either fewer or more survey options may be included without departing from the scope of this invention. Planners 80 are accessed through the fourth option of goals 508. Main menu 500 may also be customized for each user of customer system 16 by displaying beneath the survey options 502, 504 and 506 a percentage-completed/date line 510 to inform the customer what percentage of that survey option he or she has already completed, as well as the date of the most recent visit.

Returning to FIG. 4a, if the customer chooses goals 508 in block 132, survey system 12 then presents a goals menu in block 134, along with a default planner 80. The goals menu may be presented in the form of a drop-down selection box that the user may select to access the goals menu. This goals menu may include any situation for which a customer might want to set goals. For example, this menu may include choices such as credit card, down payment, loan payoff, major purchase, retirement, tuition, vacation, wedding, and the like. It will be understood that other suitable choices relating to financial planning may be included in this menu without departing from the scope of this invention. After the customer chooses one of the options presented by the goals menu, the associated planner 80 is presented.

Figure 4C:
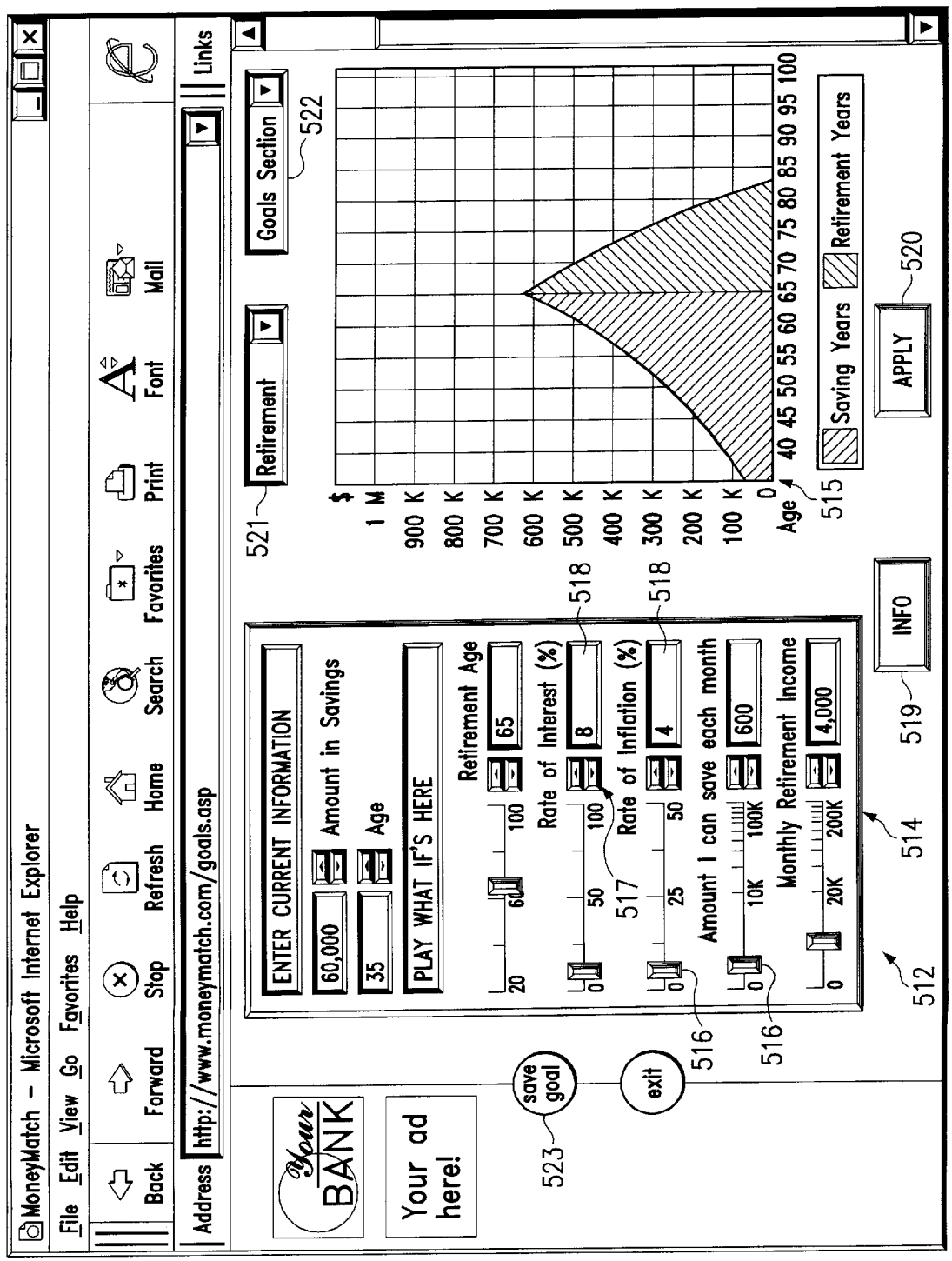
FIG. 4c is a screen shot depicting an exemplary planner constructed according to the teachings of the present invention.

FIG. 4c is a screen shot depicting an exemplary planner 80, in particular a retirement planner 512. Retirement planner 512 comprises an input section 514, an output section 515, an information button 519, an apply button 520, a goals menu 521, a survey section selector 522, and a save goal button 523. Input section 514 allows a customer to input the necessary information relating to planning for retirement, such as current amount of savings, current age, retirement age, rate of interest, rate of inflation, monthly savings, monthly retirement income, and the like. Output section 515 shows the retirement savings increasing until the retirement age and, typically, decreasing afterwards. By adjusting the figures in input section 514, a customer can determine by simply looking at output section 515 what actions must be taken in order to reach his or her retirement goals. Planners 80 may comprise Java applets that are sent to customer system 16 through network 18 and which allow planners 80 to make real-time adjustments to output when the customer changes the input. In this way, the customer avoids the delay caused by requiring customer system 16 to send each change in input to survey system 12 through network 18 and survey system 12 to send the corresponding output back to customer system 16 through network 18. As an alternative to Java applets, this may be accomplished with any other minimal footprint application.

Thus, there is no need for the customer to submit one set of changes to the input information at a time and wait for the corresponding output. This makes possible features such as sliders 516 and arrows 517. Using sliders 516 and arrows 517, the customer may make continuous adjustments back and forth while viewing corresponding changes in the output section 515 in real time. For example, as the customer moves the slider 516 associated with retirement age to the right or left, the graph shown in the output section 515 expands or contracts to show the corresponding increase or decrease in savings before and after retirement. Arrows 517 may be used in the same manner to adjust the input information and thereby change the output section 515. Data cells 518 may also be used to adjust the input information, but data cells 518 allow the customer to input one specific number at a time, as opposed to the continuous changes possible with sliders 516 and arrows 517.

Information button 519 allows the customer to access information about products and/or services offered by the business relating to the specific financial goal the customer has chosen. Apply button 520 presents an application that allows the customer to apply for those products and/or services. Survey system 12 may automatically prepare and transmit an e-mail message to the business to indicate that such an application has been received and stored in completed application table 74 of matching database 24 for retrieval by business system 14. According to one embodiment, information button 519 may comprise adjacent text to inform the customer what type of information may be accessed by clicking on information button 519, and apply button 520 may also comprise adjacent text to inform the customer what type of product or service is available through the associated application. Survey system 12 may also store in matching database 24 the customer's identification number, as well as data relating to whether the customer chose information button 519 or apply button 520 and whether the customer submitted an application. This data may be used by business report generator 51 to generate reports for business system 14, as described in more detail below in connection with FIG. 6c.

As described above in connection with block 132 of FIG. 4a, the goals menu 521 may be presented in the form of a drop-down selection box. This goals menu 521 may include any situation for which a customer might want to set goals. At any time while the customer is using retirement planner 512 or any other planner 80 to set financial goals, the customer may select another option from the goals menu 521.

Survey system 12 will then present the appropriate planner 80. In addition, at any time while using the retirement planner 512 or any other planner 80, the customer may choose to switch to another survey section through the survey section selector 522, which may also be presented in the form of a drop-down selection box. For example, the customer may select "spend" from the survey section selector 522, and survey system 12 will then present the appropriate question from the spend section of the survey.

Save goal button 523 allows the customer to save the data entered into input section 514 for later retrieval. Survey system 12 may then provide the data to the business via business system 14 to allow the business to target marketing efforts for products and/or services related to the goals in which the customer showed an interest.

Figure 4D:
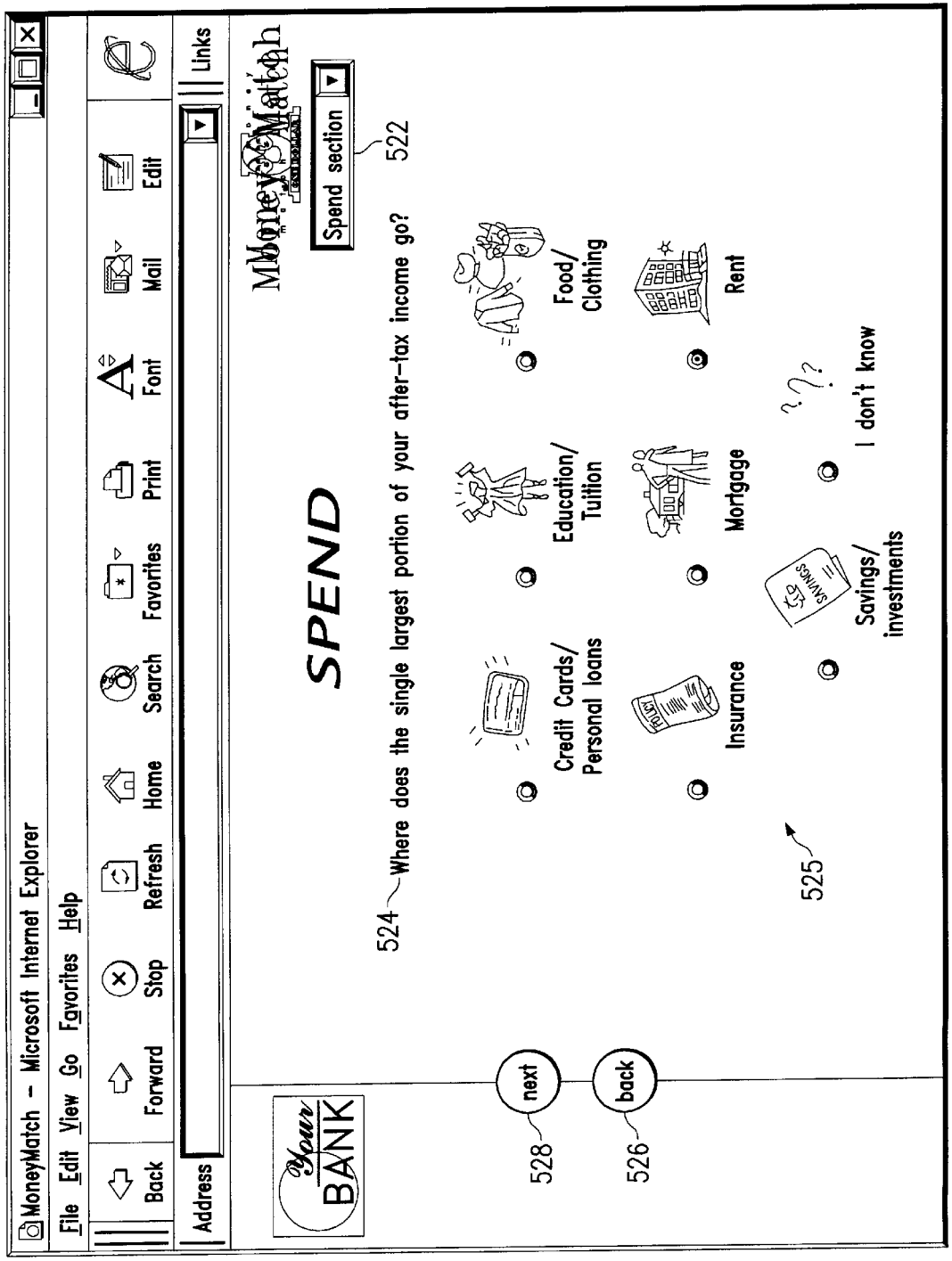
FIG. 4d is a screen shot depicting an exemplary survey question and possible answers constructed according to the teachings of the present invention.

If, instead of choosing goals 508 from the main menu 500, a customer chooses one of the survey options, such as spend 504, the customer is then given the corresponding survey questions that were previously chosen by the business and stored in matching database 24, as shown in block 136 of FIG. 4a. The possible answers to each question may also be chosen by the business and stored in matching database 24, and they may be presented with both text and graphics. For example, FIG. 4d is a screen shot depicting an exemplary question 524 and possible textual and graphical answers 525 from a spend 504 survey section. This screen also includes the survey section selector 522 described above in connection with FIG. 4c to allow the customer to switch to another survey section at any time. Also shown in FIG. 4d are a back button 526 and a next button 528. If the customer decides that he or she wants to move backward to the previous screen, the customer may select the back button 526. Alternatively, the customer may select the next button 528 after choosing a response to a particular question. Selecting the next button 528 allows the customer to go forward to the next screen, which could be either another question or a feedback page.

Figure 4E:
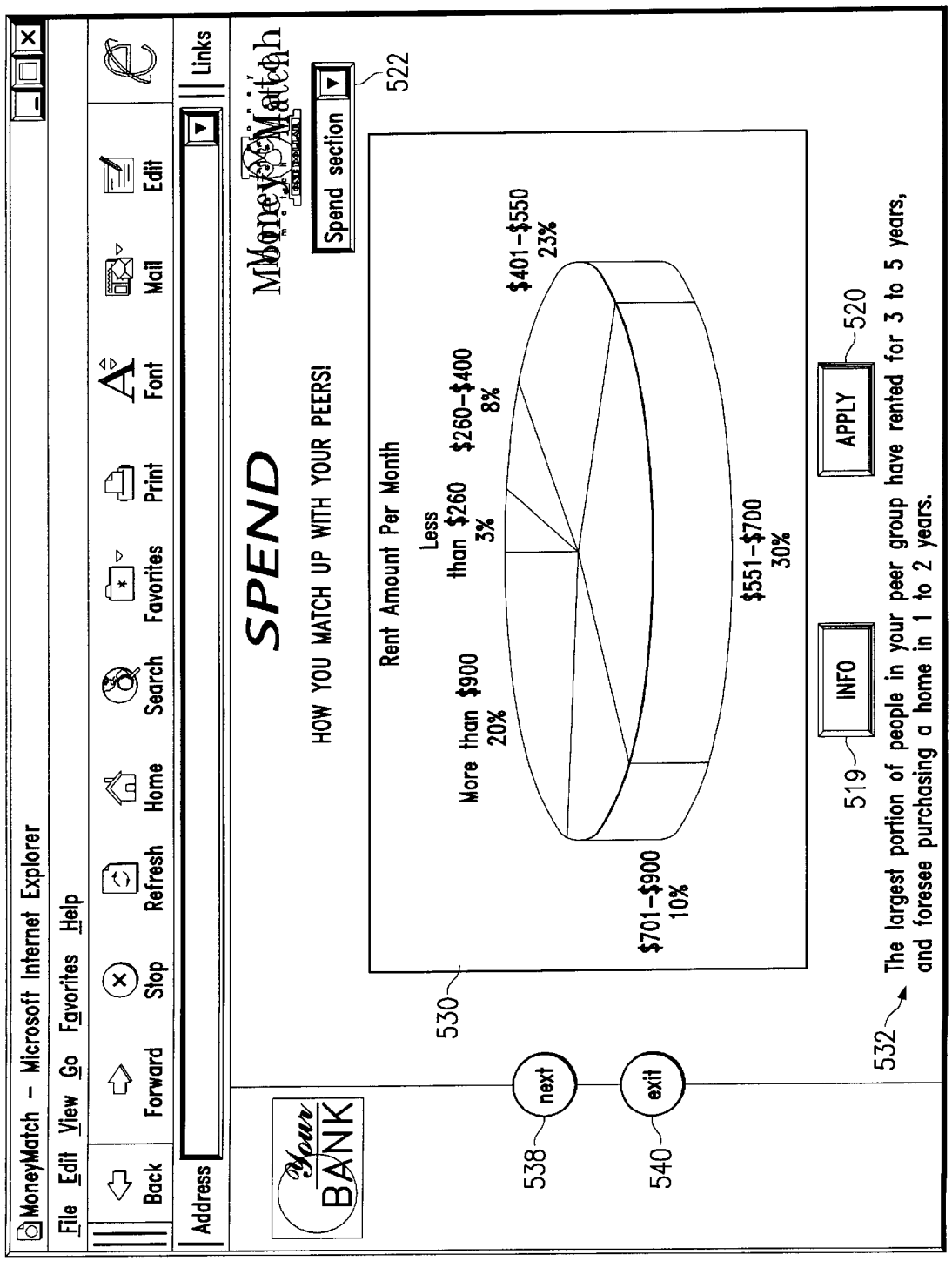
FIG. 4e is a screen shot depicting an exemplary feedback page constructed according to the teachings of the present invention.

FIG. 4e is a screen shot depicting an exemplary feedback page. A feedback page allows a customer to see after each question or after every few questions how his or her responses compare with other customers sharing the same or similar demographics. This feature may be used as another reward for customers to motivate them to respond to the survey. The feedback page pictured in FIG. 4e comprises one or more charts 530 and one or more comparison statements 532. Chart 530 could be a pie chart, a bar chart, a percentile chart, or the like. Chart 530 shows the customer how all other customers with the same or similar demographics have responded to the previous questions. Comparison statement 532 is a statement informing the customer of how the greatest portion of other customers with the same or similar demographics responded. On the feedback page, the customer may click on chart 530 or comparison statement 532 and survey system 12 will present a tally and percentages for each possible answer. Data represented in chart 530 and comparison statement 532 may be updated at regular intervals, such as once each hour or once each day. Alternatively, the data may be updated with every response so that each customer's responses are included in the data presented to that customer in the feedback page. Thus, the information presented in the feedback page may change at specified times to reflect new data received from users of customer system 16.

The feedback page also includes the survey section selector 522 described above in connection with FIG. 4c to allow the customer to switch to another survey section at any time. In addition, each feedback page may also comprise information button 519 and apply button 520. Information button 519 allows the customer to access information about products and/or services offered by the business relating to the material presented in the feedback page.

Apply button 520 allows the customer to apply for those products and/or services. This feature is beneficial to both the customer and the business. The customer has the convenience of applying for a product or service by simply clicking the apply button 520 and providing the appropriate information, while the business has the marketing advantage provided by the availability of this application to the customer in conjunction with the material presented in the feedback page. For example, a customer may learn from a feedback page that his or her peers generally have three credit cards, while he or she has only one. As soon as this information is presented, the customer has the option of clicking on the apply button 520 and applying for another credit card. Thus, this is one form of targeted marketing provided by the present invention. If a customer applies for a product or service in this manner, survey system 12 may also automatically prepare and transmit an e-mail message to the business to indicate that an application has been received and stored in matching database 24 for retrieval by business system 14.

According to one embodiment, information button 519 may comprise adjacent text to inform the customer what type of information may be accessed by clicking on information button 519, and apply button 520 may also comprise adjacent text to inform the customer what type of product or service is available through the associated application. Survey system 12 may also store in matching database 24 the customer's identification number, as well as data relating to whether the customer chose information button 519 or apply button 520 and whether the customer submitted an application. This data may be used by business report generator 51 to generate reports for business system 14, as described in more detail below in connection with FIG. 6c.

The feedback page also comprises a next button 538 to allow the customer to continue to the next screen and an exit button 540 to allow the customer to return to the main menu 500, as shown in FIG. 4b and in block 132 of FIG. 4a. If the customer chooses the next button 538, the customer will either continue to another question, such as the one shown in FIG. 4d, or will continue to a "what-if" page if the survey section has been completed.

After the customer has completed any one section of the survey, such as borrow 502, spend 504, or save & invest 506, survey system 12 presents a "what-if" page, as shown in block 138 of FIG. 4a. The "what-if" page displays the information previously communicated to the customer in all the feedback pages, such as the one shown in FIG. 4e, that are associated with that particular survey section. Thus, previously displayed charts 530 and comparison statements 532 are redisplayed for the customer to review. The "what-if" page also displays information that relates to topics not presented to the customer during the survey. These topics may not have been presented during the survey because the customer's response to a question made the topic irrelevant for that customer. The "what-if" page also allows the customer to make adjustments by changing his or her demographic parameters such as income level, number of children, and the like. Then survey system 12 displays the comparison information for the customer's hypothetical demographic. This allows the customer to see how his or her situation compares with others who have a demographic the customer wonders about or expects or hopes to have in the future. On the "what-if" page, the customer may also click on any one of the charts 530 or comparison statements 532 and survey system 12 will present a tally and percentages for each possible answer.

Figure 4F:
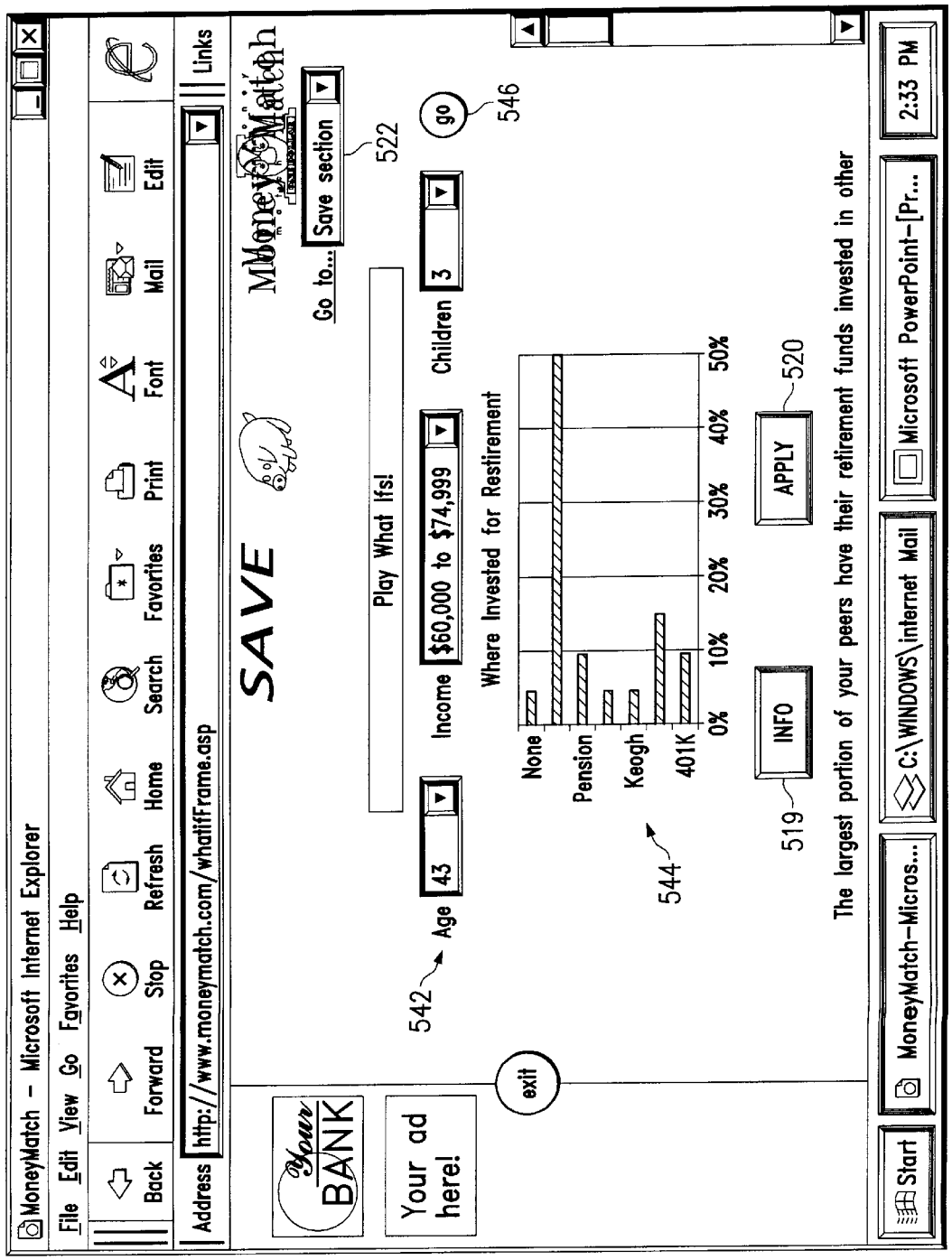
FIG. 4f is a screen shot depicting an exemplary hypothetical "what-if" page constructed according to the teachings of the present invention.

FIG. 4f is a screen shot depicting an exemplary "what-if" page. The "what-if" page may comprise a demographic line 542 and a feedback section 544. Demographic line 542 may be used by the customer to access the comparison data associated with the hypothetical demographic in which he or she is interested. This comparison data may then be displayed in feedback section 544. Initially, demographic line 542 may be preset to the customer's actual demographics, and feedback section 544 may display the associated comparison data. After making adjustments to the parameters in demographic line 542, the customer may click on the go button 546. Survey system 12 may then retrieve the appropriate data from matching database 24 and display that data in feedback section 544. The customer may continue to make adjustments and view the comparison data as often as he or she wishes. Feedback section 544 may comprise multiple charts 530 and comparison statements 532 that may be accessed through scrolling. The "what-if" page also includes the survey section selector 522 described above in connection with FIG. 4c to allow the customer to switch to another survey section at any time.

In addition, each "what-if" page may also comprise information button 519 and apply button 520. Information button 519 allows the customer to access information about products and/or services offered by the business. Apply button 520 allows the customer to apply for those products and/or services. Information button 519 may comprise adjacent text to inform the customer what type of information may be accessed by clicking on information button 519, and apply button 520 may also comprise adjacent text to inform the customer what type of product or service is available through the associated application. Survey system 12 may also store in matching database 24 the customer's identification number, as well as data relating to whether the customer chose information button 519 or apply button 520 and whether the customer submitted an application. This data may be used by business report generator 51 to generate reports for business system 14, as described in more detail below in connection with FIG. 6c.

FIGS. 5a–d are flowcharts showing one embodiment of the present invention. At step 140 of FIG. 5a, survey system 12 presents a welcome display to the user of customer system 16. Next survey system 12 determines whether the customer has entered demographic information previously or whether a certain amount of time has passed since the customer entered demographic information, as shown in step 142. If the customer is new or enough time has passed since the customer entered demographic information, survey system 12 then presents the demographics question page to the customer in step 144. Alternatively, the customer may choose to have the demographics question page presented if any characteristics have changed since the previous visit. The demographics question page prompts the customer to enter information relating to the customer's income level, age, gender, and the like. After the information has been entered by the customer, survey system 12 stores the demographic information in matching database 24, as shown in step 146. If the customer was not required to enter demographic information or after the demographic information has been stored, survey system 12 next presents to the customer the main menu 500 in step 148.

The customer then selects an option from the main menu 500, and survey system 12 responds in one of two ways based on which icon the customer selects, as shown in step 150. The customer may select an icon for either goals 508 or one of the survey options 502, 504 or 506.

Figure 5A:
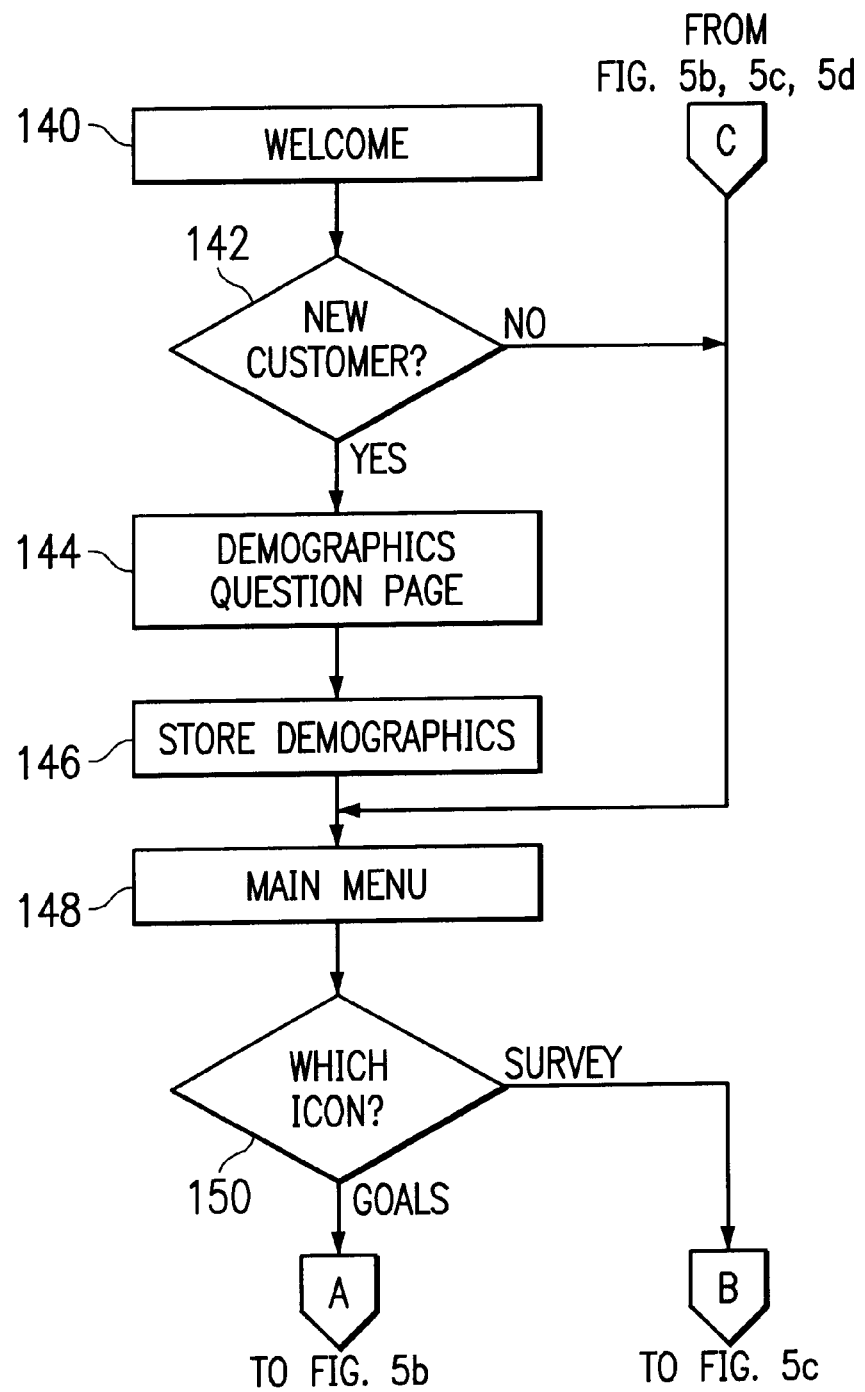
FIGS. 5a–d are flowcharts showing the progress of a session using an embodiment of the present invention.
Figure 5B:
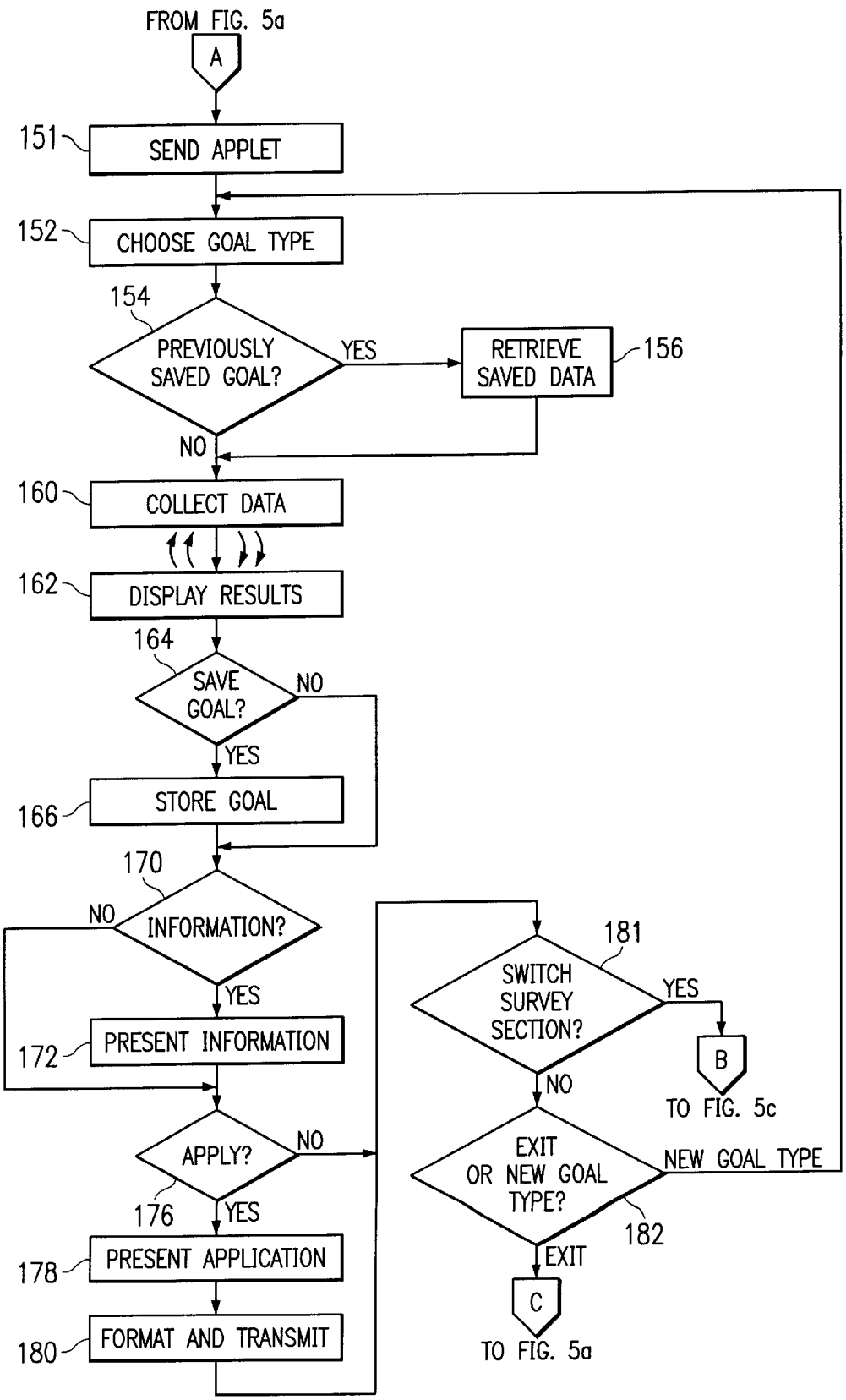

As shown in FIGS. 5a and 5b, if the customer selects goals 508 in step 150, survey system 12 presents a default planner 80 by sending an applet created using Java or any other suitable applet technology to customer system 16, as shown in step 151. Survey system 12 also presents a goals menu 521 in step 152 that allows the customer to access a planner 80 other than the one originally presented by choosing a new goal type. If the customer selects a new goal type, survey system 12 searches matching database 24 to determine whether or not the customer has previously saved input information for that goal type, as shown in step 154. If the customer has saved input information, survey system 12 retrieves the saved data in step 156. This saved data will be automatically entered into the appropriate fields of the input section 514 of the planner 80. If the customer has not saved input information for that goal type, default input information is entered into the input section 514 of the planner 80. At this point, the customer may enter new input information or change saved input information, as shown in step 160, in order to adjust the output section 515, as shown in step 162, until the results are satisfactory to the customer. As the customer changes the input information, the results in output section 515 are adjusted dynamically in real time. The customer may change the input information to see in real time the corresponding output as often as desired, as indicated in steps 160 and 162. Once the customer has finished making adjustments to the input information, the customer may choose an option that will save the input information for future use, as shown in step 164. If the customer chooses this option, survey system 12 will save the data entered into input section 514 in matching database 24 in step 166. Survey system 12 may then provide the data to the business to allow the business to help the customer attain those financial goals by marketing related products and services to that customer.

While the customer is using the planner 80, he or she may also select the information button 519, as shown in step 170, or the apply button 520, as shown in step 176. If the customer selects the information button 519, survey system 12 presents the related information about the business' products and/or services, as shown in step 172. On the other hand, if the customer selects the apply button 520, survey system 12 presents the related application for the business' products and/or services in step 178. After the customer has entered the requested information, survey system 12 formats the data and transmits it to the completed application table 74 of matching database 24 in step 180 for storage and later retrieval by the business. Survey system 12 may automatically prepare and transmit an e-mail message to the business to indicate that such an application has been received. Survey system 12 may also store in matching database 24 the customer's identification number, as well as data relating to whether the customer chose information button 519 or apply button 520 and whether the customer submitted an application. This data may be used by business report generator 51 to generate reports for business system 14.

While using the planner 80, the customer may also choose the survey section selector 522, as shown in step 181. If the customer chooses to switch to a survey section, survey system 12 will present the appropriate question as shown at step 184 in FIG. 5c.

The customer may also decide to exit the planners 80 or to select a new goal type, as shown in step 182. If the customer decides to exit the planners 80, he or she will be returned to the main menu 500, at step 148 in FIG. 5a. If the customer decides to select a new goal type, survey system 12 returns to step 152 to allow the customer to make the new selection.

Figure 5C:
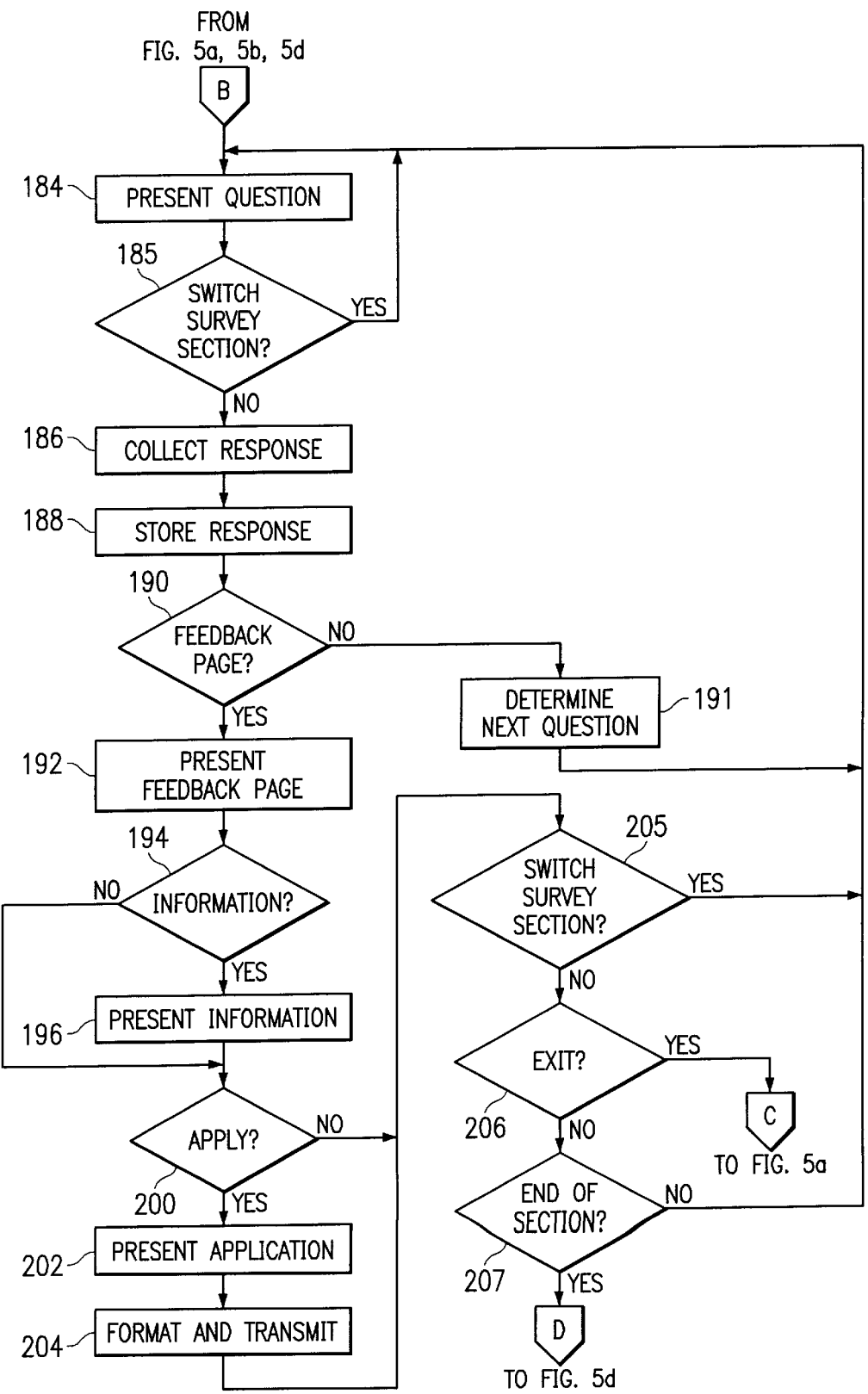

Returning to the customer's choice of options in the main menu 500, as shown in step 148 of FIG. 5a, the customer may select an icon related to one of the survey options, 502, 504 or 506. In this situation, survey system 12 presents a question from the corresponding survey section to the customer in step 184, as shown in FIG. 5c. While viewing the question, the customer may also choose the survey section selector 522, as shown in step 185. If the customer chooses to switch to another survey section, survey system 12 will present the appropriate question as shown at step 184 in FIG. 5c. However, if the customer chooses a response to the presented question in step 186, survey system 12 stores the response in matching database 24, as shown in step 188. Survey system 12 also stores data to indicate that the customer has answered this particular question. Survey system 12 may use this data to customize the main menu 500 with a percentage-completed/date line 510 and to allow the customer to return to the following question when returning to the survey after completing only part of it. After storing the response and related data, survey system 12 determines whether or not there is a feedback page to be presented at this point in the survey in step 190. If not, survey system 12 determines which question to present next based on the business identification number and the customer's previous response, as shown in step 191. The method then proceeds to step 184 where survey system 12 presents the next appropriate question. However, if at step 190 it is determined that there is a feedback page to be presented, survey system 12 presents the appropriate feedback page with the comparison data compiled from the responses of customers with the same or similar demographics as the current customer, as shown in step 192. Survey system 12 will also present a tally and percentages for each possible answer if the customer clicks on chart 530 or comparison statement 532.

While the customer is viewing the feedback page, he or she may also select the information button 519, as shown in step 194, or the apply button 520, as shown in step 200. If the customer selects the information button 519, survey system 12 presents the related information about the business' products and/or services, as shown in step 196. On the other hand, if the customer selects the apply button 520, survey system 12 presents the related application for the business' products and/or services in step 202. After the customer has entered the requested information, survey system 12 formats the data and transmits it to the completed application table 74 of matching database 24 in step 204 for storage and later retrieval by the business. Survey system 12 may automatically prepare and transmit an e-mail message to the business to indicate that such an application has been received. Survey system 12 may also store in matching database 24 the customer's identification number, as well as data relating to whether the customer chose information button 519 or apply button 520 and whether the customer submitted an application. This data may be used by business report generator 51 to generate reports for business system 14.

While viewing the feedback page, the customer may also choose the survey section selector 522, as shown in step 205. If the customer chooses to switch to another survey section, survey system 12 will present the appropriate question as shown at step 184.

Also while viewing the feedback page, the customer may select the exit button 540, as shown in step 206. If the exit button 540 is selected, the customer is returned to the main menu 500 in step 148 of FIG. 5a. Otherwise, survey system 12 determines whether the survey section has been completed, as shown in step 207. If the survey section has not been completed and the customer selects the next button 538, survey system 12 presents the next question in step 184.

Figure 5D:
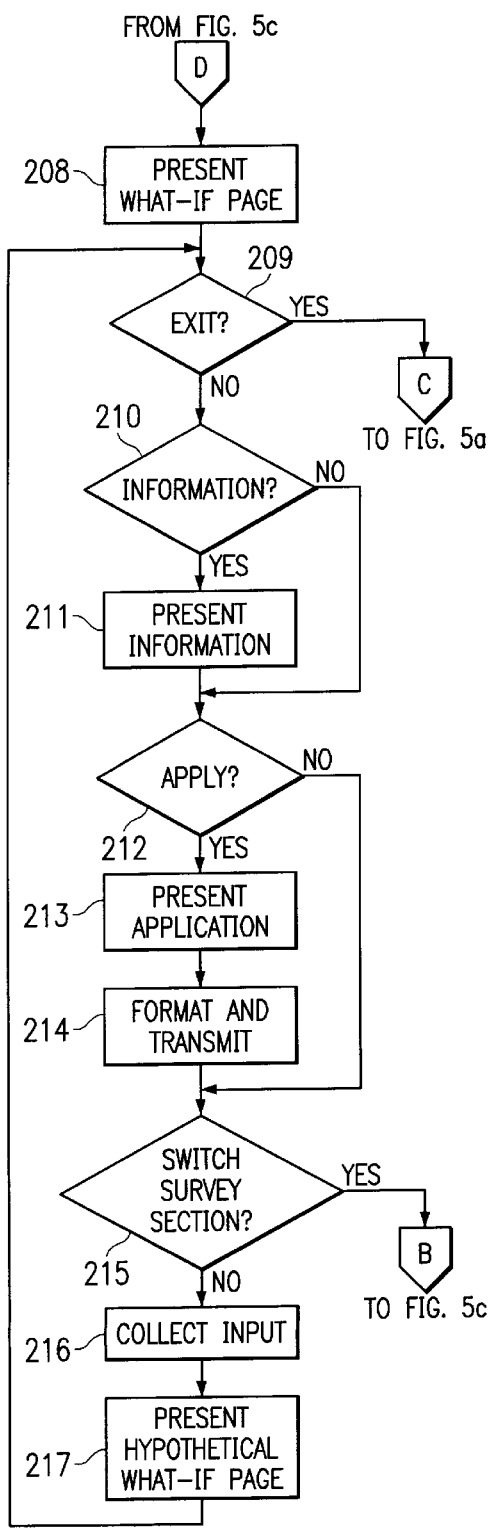

However, if the survey section has been completed, survey system 12 displays a "what-if" page in step 208 of FIG. 5d. The "what-if" page displays the information previously communicated to the customer in all the feedback pages that are associated with that particular survey section. Thus, previously displayed charts 530 and comparison statements 532 are redisplayed for the customer to review. In addition, charts 530 and comparison statements 532 are generated and displayed that relate to topics not presented to the customer during the survey. For example, if during the survey the customer responded to a question that he or she rents housing, questions regarding mortgage payments would not have been presented to that customer. However, the "what-if" page allows the customer to see the charts 530 and comparison statements 532 that would have been presented in the feedback pages associated with the mortgage-related questions. Survey system 12 will also display a tally and percentages for each possible answer if the customer clicks on one of the charts 530 or comparison statements 532.

While viewing the "what-if" page, the customer may choose to exit the page and return to the main menu 500 in step 209. In this case, survey system 12 will return to step 148 in FIG. 5a. If the customer does not choose to return to the main menu 500, survey system 12 continues to display the "what-if" page with the demographic of the customer or, if adjustments are made by the customer as described below, with the hypothetical demographic.

While the customer is viewing the "what-if" page, he or she may also select the information button 519, as shown in step 210, or the apply button 520, as shown in step 212. If the customer selects the information button 519, survey system 12 presents the related information about the business' products and/or services, as shown in step 211. On the other hand, if the customer selects the apply button 520, survey system 12 presents the related application for the business' products and/or services in step 213. After the customer has entered the requested information, survey system 12 formats the data and transmits it to the completed application table 74 of matching database 24 in step 214 for storage and later retrieval by the business. Survey system 12 may automatically prepare and transmit an e-mail message to the business to indicate that such an application has been received. Survey system 12 may also store in matching database 24 the customer's identification number, as well as data relating to whether the customer chose information button 519 or apply button 520 and whether the customer submitted an application. This data may be used by business report generator 51 to generate reports for business system 14.

While viewing the "what-if" page, the customer may also choose the survey section selector 522, as shown in step 215. If the customer chooses to switch to another survey section, survey system 12 will present the appropriate question as shown at step 184 of FIG. 5c.

The "what-if" page also allows the customer to make adjustments by making changes to his or her income level, number of children, education level, or the like, as shown in step 216. Then survey system 12 displays the charts 530 and comparison statements 532 for the customer's hypothetical demographic, as shown in step 217. This allows the customer to see how his or her responses compare with others who have a demographic the customer expects or hopes to have in the future.

Figure 6A:
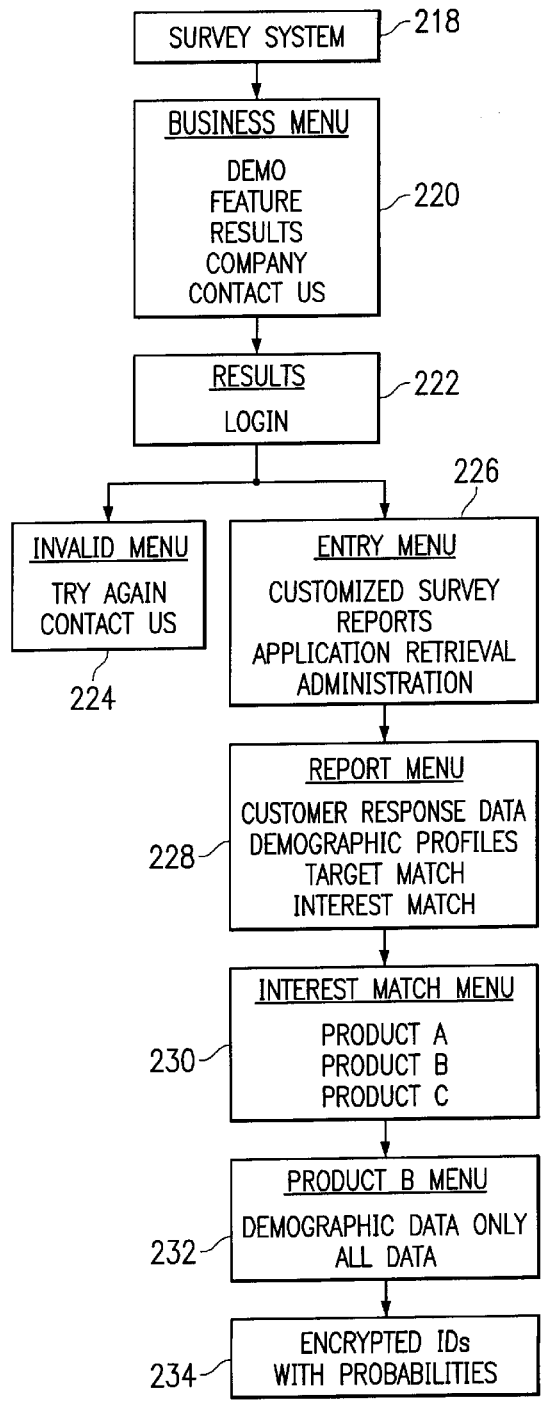
FIG. 6a is a diagram showing the progress of a session using an embodiment of the present invention from the perspective of a business.

FIG. 6a is a diagram showing an embodiment of the present invention from the perspective of a user of business system 14, such as a business representative. Block 218 shows the business representative beginning by accessing survey system 12. In block 220, survey system 12 presents to the business representative a business menu that allows the business representative to choose from several different options. This embodiment includes five options: demonstration, features, results, company, and contact us.

FIG. 6a shows one path a business representative might take through the various menus offered by survey system 12. Other possible paths will be described below. If the business representative selects the "results" option from the business menu, he or she will be presented with a login screen, as shown in block 222. At the login screen, the business representative will be prompted by survey system 12 to supply identifying information, such as a business identification number, password, or the like. Survey system 12 then compares this information with the data stored in authorized entry identification table 68 of matching database 24 to determine whether or not the user of business system 14 should be granted access to the information stored in and the reports generated by survey system 12. If the business representative enters invalid identifying information, as shown in block 224, survey system 12 provides an invalid menu that gives the business representative the option of resubmitting new identifying information or contacting the survey management company. If the business representative chooses to contact the survey management company, survey system 12 displays an e-mail page that prompts the business representative to enter the necessary information to notify the survey management company that the identifying information is not being accepted. Otherwise, the business representative is prompted to enter new identifying information in block 222.

Once the identifying information has been validated, survey system 12 provides an entry menu, as shown in block 226. At this screen, the business representative may choose to access the customized survey for his or her business, to access the reports prepared by survey system 12, to retrieve the applications submitted by users of customer system 16, or to perform administrative functions such as granting or removing authorized entry status to users of business system 14. If the business representative chooses to access the reports, survey system 12 presents a report menu, as shown in block 228. This report menu may comprise options such as customer response data, demographic profiles, TargetMatch, and InterestMatch. It will be understood that the report menu may comprise other suitable options without departing from the scope of this invention. Choosing InterestMatch allows the business representative to access the reports that show how likely users of customer system 16 are to respond to marketing efforts for a particular product or service. For example, if the business representative selects InterestMatch, survey system 12 presents an InterestMatch menu, as shown in block 230. This InterestMatch menu may list any or all of the business' products and services.

Next the business representative chooses an analysis report for a specific product or service, such as Product B. As shown in block 232, this will cause survey system 12 to present yet another menu, allowing the business representative to choose between such options as "demographic data only" or "all data." These options allow the business representative to choose what types of data to use as a basis for the reports. Choosing "demographic data only" will cause business report generator 51 to generate a report based only on the customers' demographic data. Choosing "all data" will cause business report generator 51 to generate a report based on demographic data, psychographic data, and all other data. Psychographic data includes behavioral characteristics of each customer. This data is obtained from the customers' responses to the survey questions relating to behavior or lifestyle. For example, reports generated from demographic data only could be based on each customer's income level. However, reports generated from all data could also be based on each customer's response to a question about how much money he or she would give away after unexpectedly receiving a large amount of money. Thus, these reports would be based not only on the factual demographic information provided by the customer, but also on less tangible behavioral factors that can be measured through his or her survey responses. It will be understood that other suitable options may be presented by survey system 12 on which to base reports without departing from the scope of this invention.

Once the business representative decides on this option, survey system 12 displays the analysis of the data associated with the pre-selected product or service. This analysis may include probabilities that were determined by using a commercially available statistical processing program, such as one provided by Statistical Product & Service Solutions. According to one embodiment of the present invention, input data for the statistical processing program may be retrieved by survey system 12 from matching database 24 and may comprise the business identification number, the specific product or service (dependent variable), customer identification numbers, customer demographics (attributes), and customer responses (attributes). The statistical processing program may then segment the data and predict probabilities of purchase. This may be accomplished by detecting the influence of attributes on the dependent variable, modeling continuous and non-continuous data and missing data, detecting statistically significant differences among groups of customers, merging non-significant groups of data, and creating decision rules. The output data from the statistical processing program may comprise profile numbers, profile rules, profile attributes, and profile probabilities. At this point, survey system 12 may extract the customer identification numbers from matching database 24 that match the profile attributes in the profile rules. Survey system 12 may then remove the customer identification numbers of those customers who indicated they already have the product or are using the service. Business report generator 51 may then generate a report for each profile showing the remaining customer identification numbers, the profile number, the profile probabilities, and the profile attributes. Returning to our example using Product B, survey system 12 may then present the report for Product B by listing the encrypted identification numbers of users of customer system 16 along with the probabilities that the customers with those identification numbers will purchase Product B. This is shown in block 234.

FIG. 6b is a screen shot showing an exemplary report 554 for a business representative generated by business report generator 51. This example includes a basis statement 556 that notifies the business representative which data was used to prepare the report 554. The report 554 may also include a product/service identifier 558. Columns in the report 554 may include customer identification number 560, probability of purchase 562, and link to probability profile 564. FIG. 6b also shows a probability profile 566 that might be displayed if a business representative selects a particular link in the link-to-probability-profile column 564. The information displayed in probability profile 566 would show the business representative which attributes in the profile were shared by users of customer system 16 that have the associated probability of purchase. This probability profile 566 may comprise three columns, such as profile number 567, probability 568, and profile description 570. Profile number column 567 would identify the corresponding probability profile, as shown in the link-to-probability-profile column 564. Probability column 568 would repeat the probability of purchase as shown in the probability-of-purchase column 562 of the report 554. Profile description column 570 would show the profile attributes associated with that set of customers. The profile may be a group of common characteristics of the set of customers who share the same probability of purchase. This profile may include demographic as well as psychographic data.

Returning to FIG. 6a, the business representative could select options other than InterestMatch from the report menu in block 228. If the business representative selected customer response data, business report generator 51 would present customer demographic and survey response data. This data could be presented in a spreadsheet, in a comma or tab delimited file, or by any other suitable method or format. If the business representative selected the "demographic profiles" option, business report generator 51 would present graphical depictions of the demographic data for users of customer system 16.

If the business representative selected the TargetMatch option from the report menu, business report generator 51 would present information regarding users of customer system 16 who had previously requested information on or applications for particular products or services. This information could be presented either as month-to-date or year-to-date tallies or as a list of encrypted customer identification numbers.

FIG. 6c is a screen shot depicting one embodiment of a TargetMatch report 600 prepared according to one embodiment of the present invention. Every time a customer selects information button 519 or apply button 520, survey system 12 may store that customer's identification number in matching database 24 along with the corresponding selection made by the customer. Survey system 12 may also store similar data each time a customer submits an application. When a business representative selects TargetMatch as an option from report menu, business report generator 51 may generate in real time a TargetMatch report 600 from the data previously stored in matching database 24. As shown in FIG. 6c, TargetMatch report 600 may comprise both monthly and yearly tallies for each customer selection, such as information tally, apply tally and submit tally. These tallies may be further broken down into separate tallies for each product or service which may be presented when the business representative makes his or her selection. Thus, as shown in TargetMatch report 600, during this year, ten customers have selected the information button to view information regarding credit cards, five customers have selected the apply button in connection with credit cards, and two customers have actually submitted an application for a credit card. According to one embodiment of the present invention, the business representative may click on any of the numbers listed in TargetMatch report 600 for more information. Business report generator 51 may then generate in real time a list of customer identification numbers that identify to the business those customers who requested the information or application or who submitted an application. Thus, the business may use this as a tool to target marketing efforts for a specific product or service to a particular customer who has shown an interest by requesting information or an application, but who did not submit an application.

According to one embodiment of the present invention, a business representative would have the option of choosing "results tracking & measurement" from the menu presented in block 232 of FIG. 6a. This would cause survey system 12 to present a chart listing each customer's identification number along with the probability of purchase for that customer as reported to the business by survey system 12. The business representative would then be asked to supply information regarding each customer, such as whether or not targeted marketing was performed and whether or not that customer purchased the associated product or service. This information supplied by the business representative would then be used by survey system 12 to refine the algorithms used to determine probabilities of purchase, which would make future predictions of probabilities more accurate.

Figure 6D:
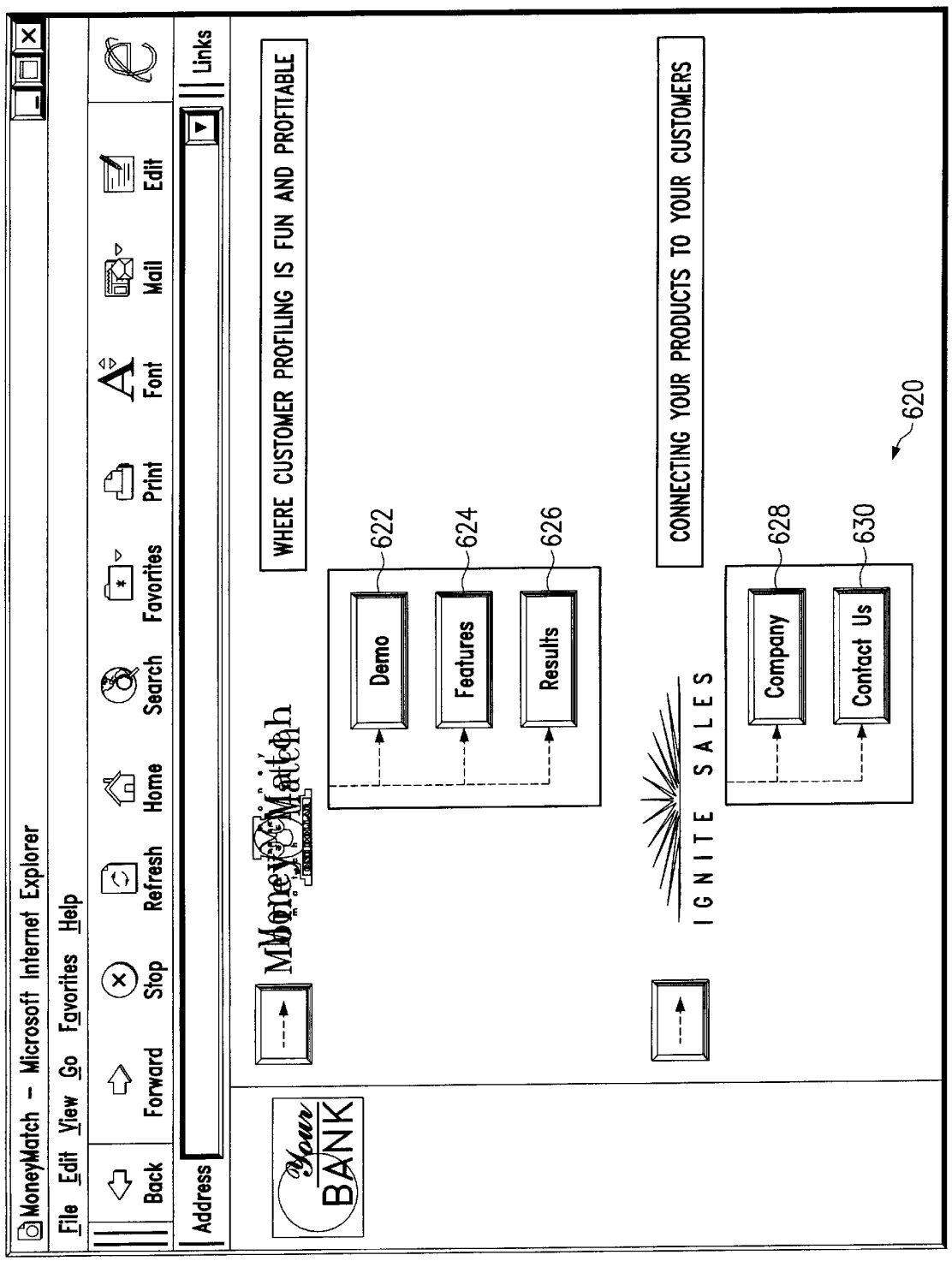
FIG. 6d is a screen shot depicting one embodiment of a business menu of a survey system constructed according to the teachings of the present invention.

FIG. 6d is a screen shot depicting one embodiment of the business menu 620 presented by survey system 12 in block 220 of FIG. 6a. From the business menu 620, the business representative could choose the option of results 626, as described above. The business representative could also select other options from the business menu 620. If the business representative selected demonstration 622, survey system 12 would present to the business representative a series of demonstration screens to show the business representative how survey system 12 functions. Selecting features 624 would allow the business representative to view information regarding the various features offered by survey system 12, while selecting company 628 would allow the business representative to view information regarding the survey management company. Finally, if the business representative selected the "contact us" option 630, survey system 12 would present an e-mail page that would prompt the business representative to enter the necessary information to notify the survey management company that the business representative would like more information or would like to set up a survey system for potential and/or existing customers.

The present invention benefits the business by allowing it to survey specific customers and to identify ones of such customers that might want to purchase particular products or services. This is accomplished by encouraging the customer to complete a series of profiling questions. The customer wants to do this because at the end of the process the customer can compare his situation relative to his peers. The customer is also allowed to explore various "what-if" scenarios to see how his relative position changes when various elements of his demographics are altered. Accordingly, the customer receives valuable evaluative information as a result of the process and the business receives information that allows for highly-defined targeted marketing efforts. All of this may be accomplished in the convenient, non-intrusive environment of an on-line interaction.

Accordingly, an integrated system is provided that prepares customized surveys, characterizes existing and potential customers, submits surveys to customers, stores responses to surveys, allows customers to retrieve product and service information, allows customers to apply for specific products and services, and prepares reports for businesses to use for targeted marketing. In addition, this system provides graphical reports for customers that compare their responses to the responses of others with the same or similar demographics. This system also allows a customer to provide information regarding financial goals and to graphically ascertain what adjustments need to be made to meet those goals.

While the invention has been particularly shown and described by the foregoing detailed description, it will be understood by those skilled in the art that various other changes in form and detail may be made without departing from the spirit and scope of the invention.

What is claimed is:

1. A method of compiling customer data using an online interaction between a customer and a survey system, comprising:
    providing the customer with customer questions;
    receiving responses to the customer questions from the customer;
    storing data associated with the responses in the survey system;
    providing the customer with a feedback page, graphically illustrating data associated with the customer's standing in a selected peer group;
    providing the customer with options operable to adjust the customer's actual demographic to a hypothetical demographic;
    receiving and processing data associated with hypothetical demographic changes from the customer; and
    displaying hypothetical feedback information, graphically illustrating the hypothetical standing of the customer within the selected peer group such that the customer can see the effect of the hypothetical demographic changes.

2. The method of claim 1, wherein the customer questions comprise a primary set of questions and a secondary set of questions.

3. The method of claim 2, wherein the primary set of questions relates to the customer's demographic and wherein the customer's demographic includes personal information about the customer.

4. The method of claim 2, wherein the secondary set of questions forms a plurality of survey sections and wherein the secondary set of questions comprises both questions that relate to a business' products or services and questions that relate to the customer's psychographic traits.

5. The method of claim 1, wherein the customer question provided is chosen based on the customer's response to the previous customer question and on a business identification number.

6. The method of claim 1, wherein the feedback page is generated based on the customer's responses to the customer questions.

7. The method of claim 1, wherein the possible answers to the customer questions include graphics illustrative of and associated with at least some of the answers.

8. The method of claim 1, further comprising presenting the customer with an online option associated with an opportunity to gain pertinent information related to and apply for or purchase products or services.

9. The method of claim 8, further comprising sending a message to a business offering the products or services regarding the application or request for the products or services.

10. A method of compiling customer data using an online interaction between a customer and a survey system, comprising:
    providing the customer with customer questions;
    receiving responses to the customer questions from the customer;
    storing data associated with the responses in the survey system;
    providing the customer with a feedback page, graphically illustrating data associated with the customer's standing in a selected peer group;
    providing the customer with options operable to adjust the customer's actual demographic to a hypothetical demographic;
    receiving and processing data associated with hypothetical demographic, changes from the customer;
    displaying hypothetical feedback information, graphically illustrating the hypothetical standing of the customer within the selected peer group such that the customer can see the effect of the hypothetical demographic changes;
    receiving a business identification number and a customer identification number;
    matching the business identification number with data in at least one table;
    matching the customer identification number with data in at least one table; and
    generating data sets for display based on the data in the at least one table.

11. The method of claim 1, further comprising providing a business with compiled customer profile information where the customer is identified as a particular existing customer of the business.

12. The method of claim 1, further comprising providing percentage completion and date information to the customer based on the percentage of the customer questions that have been answered by the customer and the date of the most recent visit to the survey system by the customer.

13. The method of claim 1, further comprising providing goal planners to the customer.

14. The method of claim 13, wherein the goal planners include output graphics associated with the output of the goal planners and wherein the output graphics change in real time in response to changes in the input to the goal planners.

15. A customer survey system, comprising:
    a business interface operable to interact with a data processing system associated with a business;
    a customer interface operable to interact with a data processing system associated with a customer; and
    a survey system operable to supply the customer data processing system with customer questions, receive and store responses, provide a feedback page, provide what-if options, receive hypothetical demographic changes, and display hypothetical feedback information.

16. The system of claim 15, wherein the customer question provided is chosen based on the customer's response to the previous customer question and on a business identification number.

17. The system of claim 15, wherein the feedback page is generated based on the customer's responses to the customer questions.

18. The system of claim 15, wherein the survey system is further operable to present the customer with an online option associated with an opportunity to gain pertinent information related to and apply for or purchase products or services.

19. The system of claim 18, wherein the survey system is further operable to send a message to a business offering the products or services regarding the application or request for the products or services.

20. A customer survey system, comprising:
 a business interface operable to interact with a data processing system associated with a business;
 a customer interface operable to interact with a data processing system associated with a customer;
 a survey system operable to supply the customer data processing system with customer questions, receive and store responses, provide a feedback page, provide what-if options, receive hypothetical demographic changes, display hypothetical feedback information, receive a business identification number and a customer identification number, match the business identification number with data in at least one table, match the customer identification number with data in at least one table, and generate data sets for display based on the data in the at least one table.

21. The system of claim 15, wherein the survey system is further operable to provide percentage completion and date information to the customer based on the percentage of the customer questions that have been answered by the customer and the date of the most recent visit to the survey system by the customer.

22. The system of claim 15, wherein the survey system is further operable to generate data sets for display based on data accessed in at least one table and wherein the data accessed by the survey system is associated with a specific business or customer.

23. A customer survey system, comprising:
 a business interface operable to interact with a data processing system associated with a business;
 a customer interface operable to interact with a data processing system associated with a customer; and
 a survey system operable to supply the business data processing system with targeted marketing reports, the targeted marketing reports dynamically generated based on a set of decision rules, the set of decision rules dynamically generated based on data received from the customers.

24. The system of claim 23, wherein the targeted marketing reports comprise a probability associated with at least one customer regarding the likelihood that the customer will purchase a specific product or service.

25. The system of claim 24, wherein the survey system is further operable to generate targeted advertisements for each customer based on the data in the targeted marketing reports.

26. The method of claim 13, further comprising:
 receiving goal input data from the customer, the goal input data related to a goal associated with the goal planners; and
 storing the goal input data for the customer.

27. The system of claim 15, the survey system further operable to provide goal planners to the customer, to receive coal input data from the customer, the goal input data related to a goal associated with the goal planners, and to store the coal input data for the customer.

28. The system of claim 15, the survey system further operable to generate targeted advertisements for each customer based on data received from the customers.

* * * * *